US007006366B2

(12) United States Patent
Panda et al.

(10) Patent No.: US 7,006,366 B2
(45) Date of Patent: Feb. 28, 2006

(54) BOOST RECTIFIER WITH HALF-POWER RATED SEMICONDUCTOR DEVICES

(75) Inventors: Debiprasad Panda, Willoughby Hills, OH (US); Thomas A. Lipo, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/865,043

(22) Filed: Jun. 10, 2004

(65) Prior Publication Data

US 2005/0276082 A1 Dec. 15, 2005

(51) Int. Cl.
*H02M 7/217* (2006.01)
(52) U.S. Cl. ...................................... 363/70
(58) Field of Classification Search ................ 363/69, 363/70, 127
See application file for complete search history.

(56) References Cited

U.S. PATENT DOCUMENTS 4,739,466 A * 4/1988 Glennon et al. .............. 363/89

OTHER PUBLICATIONS

Jun Kikuchi, et al., Complementary Half Controlled Three Phase PWM Boost Rectifier for Multi-DC-Link Applications, Proceedings of IEEE Applied Power Electronics Conference 2000, vol. 1, Jan. 1999, pp. 494-500.

Jun Kikuchi, et al., "Performance Improvement of Half Controlled Three Phase PWM Boost Rectifier," Proceedings of IEEE Power Electronic Specialists Conference, 1999, vol. 1, Jan. 1999, pp. 319-324.
C.H. Treviso, et al., "A Three Phase PWM Boost Rectifier with High Power Factor Operation and an Acceptable Current THD Using Only Three Switches," ENE '97, Trondheim, pp. 2.934-2.939, no month.
Steffen Bernet, et al., "A Matrix Converter Using Reverse Blocking NPT-IGBT's and Optimized Pulse Patterns," IEEE, 1996, pp. 107-113, no month.
T. Summers, et al., "Dead-Time Issues in Predictive Current Control," IEEE, 2002, pp. 2086-2093, no month.
C.M. Wu et al., "Analytical Technique for Calculating the Output Harmonics of an H-Bridge Inverter with Dead Time," IEEE Transactions on Circuits and Systems—Fundamental Theory and Applications, vol. 46, No. 5, May, 1999, pp. 617-627.
J.F. Liebaut, et al., "Effects of PWM Inverter Switching Dead Times on Bidirectional Currents Analysis and Compensation," IEEE, 1992, pp. 277-282, no month.

* cited by examiner

*Primary Examiner*—Shawn Riley
(74) *Attorney, Agent, or Firm*—Foley & Lardner LLP

(57) ABSTRACT

A rectifier has two half-controlled bridge rectifiers which are connected in parallel to provide DC power to DC bus lines. Each bridge rectifier receives AC power through inductances such as series inductors or an isolation transformer with a single primary and two secondaries. Each bridge rectifier has a full bridge of diodes, with active switching devices connected in parallel with half of the diodes in the bridge. The switching devices can be controlled to provide unity power factor at the AC input lines, allowing lower rated diodes and switching devices to be used.

28 Claims, 17 Drawing Sheets

BOOST RECTIFIER WITH HALF-POWER RATED SEMICONDUCTOR DEVICES

FIELD OF THE INVENTION

This invention pertains generally to the field of electrical power conversion and particularly to controlled rectifiers.

BACKGROUND OF THE INVENTION

AC to DC electrical power rectifiers are used in a wide variety of applications, including power supplies for various types of electrical equipment and in motor drives. The simplest and least expensive type of rectifier uses a full or half bridge of diodes to rectify single-phase or three-phase AC input power to DC power. While rectifiers formed of passive diodes are inexpensive and relatively reliable, such rectifiers can introduce significant harmonic distortion to the AC power system to which the rectifiers are connected. The total harmonic distortion (THD) introduced by such diode rectifiers may not satisfy current standards and regulations such as the IEEE 519 standard. To address these limitations, rectifiers have been developed that include active switching devices, such as IGBT transistors, connected in parallel with the diodes of the bridge (e.g., six switches for a full-bridge three-phase AC to DC rectifier), with the switches being controlled to operate to provide close to unity power factor and reduced THD as compared to passive rectifier bridges. Such active rectifiers also permit bidirectional power flow, allowing power from regenerative loads, such as large motors, to be delivered back through the rectifier to the AC power system. A disadvantage of such active rectifiers is that the switching devices are much more expensive than passive diodes, particularly since each active switch must be capable of handling the full rated current and voltage of the system.

In addition to full-bridge active rectifiers, half-controlled rectifiers have also been developed in which half of the rectifier bridge is formed of passive diodes and the other half has active switching devices in parallel with the diodes. For a three-phase AC to DC rectifier, such bridges can be formed of a bridge of six diodes and three active switches. Half-controlled three-phase pulse width modulated boost rectifiers thus can potentially be lower in cost as compared to a rectifier having a full bridge of active devices. See, C. H. Treviso, et al., "A Three-Phase PWM Boost Rectifier with High Power Factor Operation and an Acceptable Current THD Using Only Three Switches," Proc. of E.P.E '97, 1997, pp. 2.934–2.939; J. Kikuchi, et al., "Performance Improvement of Half-Controlled Three-Phase PWM Boost Rectifier," Proc. of IEEE Power Electronics Specialists Conference, 1999, Vol. 1, January 1999, pp. 319–324. Such circuits have also been developed for the purpose of supplying multiple isolated DC buses and multiple loads by employing two complementary half-controlled circuits. J. Kikuchi, et al., "Complementary Half-Controlled Three-Phase PWM Boost Rectifier for Multi-DC-Link Application," Proc. of IEEE Applied Power Electronics Conference, 2000, Vol. 1, January 2000, pp. 494–500. For an individual half-controlled circuit, the cost of the system inherently will be reduced since only three active devices are used as compared to six devices for the fully controlled counterpart. However, the price to be paid is higher THD and the presence of low order even harmonics on both the AC side and the DC side. Thus, both the system efficiency and the performance are degraded as compared to the full active bridge. The overall THD of the system was found to be improved to some extent by using a lagging power factor current command in J. Kikuchi, et al, 1999, supra.

However, appreciable THD still remained which was far from satisfactory given the IEEE 519 standards. In addition, a lagging power factor command may not suit all rectifier loads and, more typically, a unity power factor interface is preferred or required. Some of the problems affecting half-controlled rectifiers, such as the lower order harmonics from the AC side and on the DC bus, are partially solved by combining two complementary half-controlled rectifiers and applying a coordinated central control algorithm, as discussed in J. Kikuchi, et al., 2000, supra. By using this approach, the AC side THD was improved markedly, but the DC side lower order even harmonics still existed. The major objective was to have an isolated DC bus for each half-controlled circuit.

In boost rectifiers of the type discussed above, inductors are normally used in series with the input phases in order to reduce the amplitude of the switching frequency harmonics of the system. Because the phase currents will contain appreciable lower order harmonics in a conventional three-phase half-controlled rectifier circuit as compared to a fully controlled rectifier circuit, the inductors will incur extra losses. In addition, such systems may be prone to acoustic noise problems.

SUMMARY OF THE INVENTION

The rectifier of the invention is capable of delivering performance similar to that of a conventional fully rated 3-phase pulse width modulated (PWM) rectifier and, in addition, the ratings of the switches and diodes can be reduced to half the rated power. For example, the semiconductor devices need only be rated for half of the rated peak current of the rectifier allowing significantly less expensive devices to be used. The typical problems of a half-controlled circuit with low order even harmonics on both the AC and DC side are eliminated. The acoustic noise and losses across the input side inductors can be further reduced by combining the inductances on the same core.

The rectifier of the invention includes AC input lines at which AC power is received by the rectifier and DC output terminals at which DC power is provided by the rectifier. A first half-controlled bridge rectifier has an AC input and a DC output which is connected to the DC output terminals. The first half-controlled bridge rectifier has a full bridge of diodes connected between the AC input and DC output and controllable switching devices connected in parallel with half of the diodes in the bridge. A second half-controlled bridge rectifier has an AC input and a DC output which is also connected to the DC output terminals to provide DC power thereto in parallel with the first half-controlled bridge rectifier. The second half-controlled bridge rectifier has a full bridge of diodes connected between the AC input and the DC output and controllable switching devices connected in parallel with half of the diodes in the bridge. Inductances are connected between the AC input lines of the rectifier and the AC inputs of the first and second half-controlled bridge rectifiers to provide AC power to the bridge rectifiers through the inductances; and a controller is connected to the switching devices of the first and second half-controlled bridge rectifiers to control the switching thereof.

Where AC isolation is desired, the inductances connected between the AC input terminals and the AC inputs of the bridges can comprise a transformer having a primary connected to the AC input lines of the rectifier and a first secondary connected to the AC input of the first bridge rectifier and a second secondary connected to the AC input of the second bridge rectifier. The first and second secondaries of the transformer are preferably complementary and oppositely poled. The transformer may be a three-phase transformer having a three-phase primary and two three-phase secondaries, with the first and second half-controlled bridges formed of six diodes connected to the transformer secondaries between pairs of upper and lower diodes, and with the switching devices in each of the half-controlled bridges are connected in anti-parallel with the three lower diodes in each bridge of diodes. The switching devices can comprise IGBTs connected in anti-parallel with the diodes and having gate inputs connected to receive gate control signals from the controller.

Where AC isolation is not needed, the inductances can comprise inductors connected in series between each of the AC input lines of the rectifier and a junction between each pair of diodes in the first and second half-controlled bridge rectifiers. For three phase operation, there are three AC input lines to the rectifier to receive three-phase AC power, and each of the AC input lines is connected through an inductor to a junction between one pair of diodes in the first half-controlled bridge rectifier and a pair of diodes in the second half-controlled bridge rectifier. Six diodes in each of the first and second half-controlled bridge rectifiers are connected in pairs of upper and lower diodes and the switching devices are connected in anti-parallel with the lower diodes in the first half-controlled bridge and are connected in anti-parallel with the upper diodes of each pair in the second half-controlled rectifier bridge. The switching devices may again comprise IGBTs having gate inputs connected to receive gate control signals from the controller.

The controller preferably receives signals corresponding to the input voltage across at least two of the input lines of the rectifier, the output voltage across the output terminals of the rectifier, and the output currents from the first and second half-controlled bridge rectifiers. The controller preferably controls switching devices of the first and second half-controlled rectifier bridges for unity power factor at the AC input lines of the rectifier, although leading and lagging power factor operation is also possible if desired. Each rectifier is effectively operated as an active filter such that the switching devices on one bridge rectifier which are active can be controlled to cancel harmonics in the other bridge rectifier which is acting as a passive rectifier.

In the transformer isolated rectifier configuration of the invention, both of the half-controlled rectifier circuits may be a common emitter type so that an isolated power supply rectifier for the gate drivers is not necessary. For the transformerless rectifier configuration, the common collector type half-controlled circuit will require an isolated gate driver circuit.

The rectifiers of the invention, with or without a transformer, are shoot-through safe and do not need to incorporate dead time compensation. Thus, the gate drive circuit requirements for the present rectifier are simplified as compared to fully controlled rectifiers. Also, because of the absence of dead time, the rectifier of the invention will not produce distortion in current waveforms at lighter loads, which is typically the case for the conventional six switch thyristor rectifier.

The efficiency of the present rectifier is higher since the switching losses across the device is reduced due to lower switching currents though the switches and diodes. In general, losses in the semiconductor devices are reduced by almost 16.5% compared to a regular six switch configuration, while the losses in the AC side inductors (a transformer) are increased by roughly 2%, so that the combined loss in the rectifier and inductor (transformer) is less with the present rectifier by almost 15%. The present rectifier requires two additional current sensors for measuring the currents of the two independent half-controlled rectifiers. For a given switching frequency, the isolation transformer (or inductors) of the present rectifier will be 5–6% greater in volume compared to that of a normal rectifier. However, because the losses are lower in the present rectifier, the switching frequency can be increased up to 25%, and thus the inductor size can be reduced to a smaller volume than typically used for a conventional rectifier, if desired.

The rectifier of the invention is rugged and fault tolerant because of its inherent shoot-through structure, and because the present rectifier is more efficient, heat sink requirements are reduced. Conversely, if efficiency levels similar to a conventional rectifier are acceptable, the rectifier can be operated at higher switching frequencies which, in turn, reduces the input side filter requirements.

Further objects, features and advantages of the invention will be apparent from the following detailed description when taken in conjunction with the accompanying drawings.

DETAILED DESCRIPTION OF THE INVENTION

Figure 1:
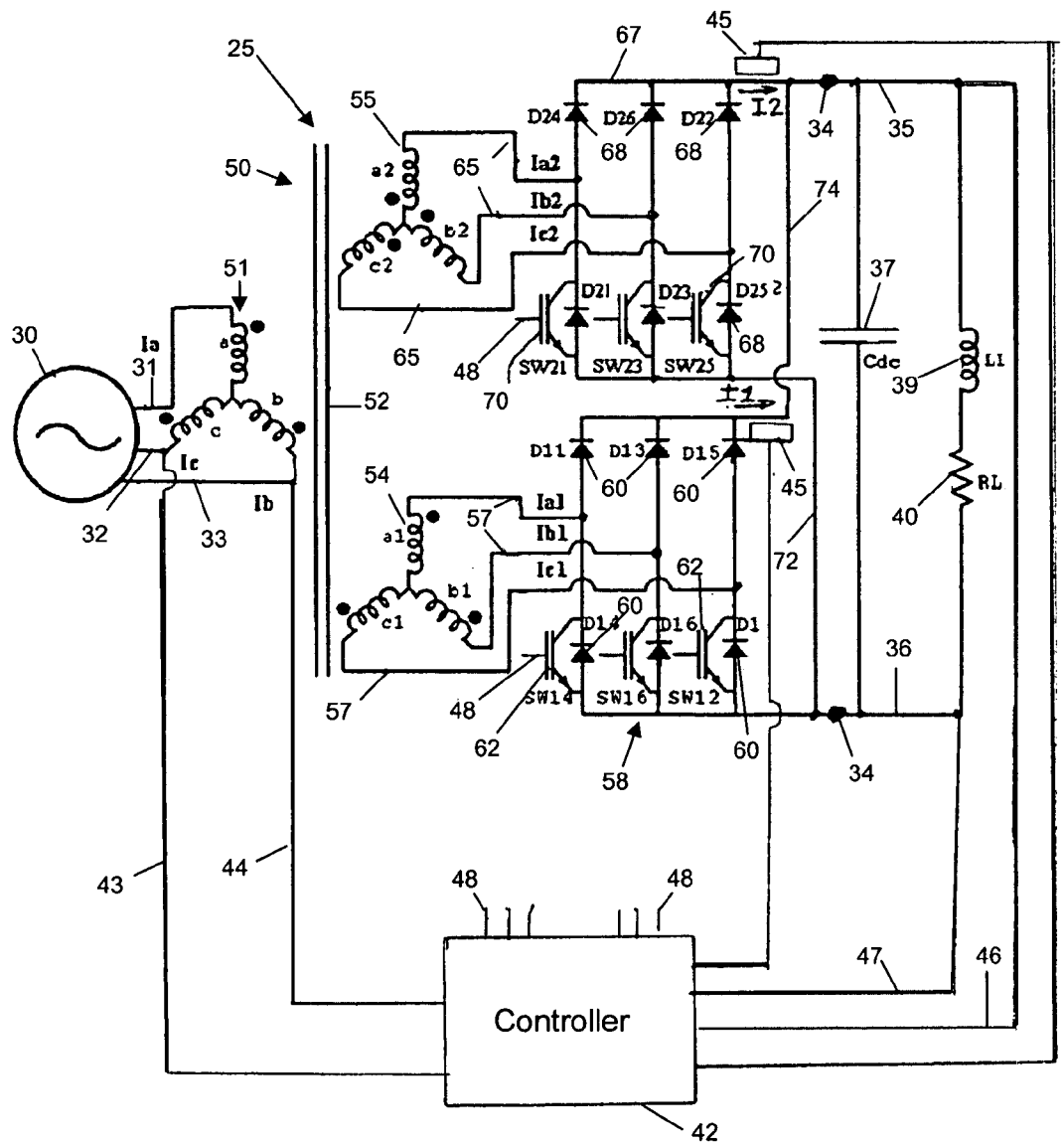
FIG. 1 is a schematic circuit diagram of a rectifier in accordance with the invention having an AC side isolation transformer.

The rectifier of the present invention may be implemented in three-phase AC systems, and with and without AC side transformer isolation. For purposes of illustrating the principles of the invention, a three-phase boost rectifier in accordance with the invention having AC side transformer isolation is shown generally at 25 in FIG. 1, and a three-phase boost rectifier in accordance with the invention without AC side isolation is shown generally at 27 in FIG. 2. The principles of operation of the boost rectifiers 25 and 27 are essentially similar. A three-phase AC source 30 (e.g., AC power mains or a generator) provides three-phase AC power on rectifier input lines 31, 32 and 33, and each of the rectifiers 25 and 27 provide DC output power at rectifier output terminals 34 connected to DC bus lines 35 and 36 which have a DC bus capacitor 37 connected between them. The output terminals 34 may be discrete connectors but may also be, for example, conductors connected integrally with the conductors of the DC bus lines. For purposes of illustration, an inductance 39 and a resistance 40 are shown connected in series across the DC bus lines 35 and 36 to represent a DC load, it being understood that the rectifiers 25 and 27 may be used to supply DC power to any type of DC load, including, e.g., DC motors, DC power systems, and inverters which convert the DC power to AC power at selected frequencies. A controller 42 is connected by lines 43 and 44 to two of the input phase lines (for illustration, the lines 32 and 33) to provide one of the AC side phase voltages to the controller, and the controller 42 also receives signals corresponding to the bridge output currents I1 and I2 from current sensors 45. The controller 42 also is connected by lines 46 and 47 to the DC bus lines 35 and 36 to provide the voltage $V_{dc}$ across the DC bus lines to the controller. The controller utilizes the input phase voltage and the voltage across the DC bus to provide switch control signals on control lines 48 to gate controlled switches within the rectifiers 25 and 27 as described further below.

In the AC isolated rectifier 25 of FIG. 1, a three-phase transformer 50 has a primary 51 connected to the three input phase lines 31, 32 and 33, and the primary 51 is coupled through a core 52 to a first three-phase secondary 54 and a second three-phase secondary 55. The two secondaries 54 and 55 are poled to be complementary to each other as illustrated by the polarity dots shown in FIG. 1. The first secondary 54 provides AC output voltages on three output lines 57 to a first half-controlled rectifier bridge 58 formed of six diodes 60, connected in a full bridge configuration, and three gate controlled switches 62, e.g., insulated gate bipolar transistors (IGBTs) connected in anti-parallel with the lower three diodes in the bridge. The second secondary 55 provides AC output power on three lines 65 to a second complementary half-controlled rectifier bridge 67 formed of six diodes 68 connected in a full bridge configuration and three gate controlled switches 70 (e.g., IGBTs) connected in anti-parallel with the lower three diodes 68 in the bridge. The IGBT switching devices 62 shown in FIG. 1 are connected in common emitter configuration to the lower DC bus line 36, and the IGBT switches 70 are also connected in common emitter configuration via a conductor 72 to the lower DC bus line 36. The upper diodes 68 of the second rectifier bridge 67 are connected to conduct in a forward direction to the top DC bus line 35, and the upper diodes 60 in the lower bridge 58 are connected via a conductor 74 to conduct current in a forward direction to the upper DC bus line 35. Thus, the DC outputs of the bridges 58 and 67 are connected in parallel with each other across the output terminals 34 to the DC bus lines 35 and 36. For purposes of explaining the operation of the invention, the lower diodes 60 in the first rectifier bridge 58 are labeled D12, D14 and D16, the upper diodes 60 are labeled D11, D13 and D15, and the switches 62 are labeled SW12, SW14 and SW16. The lower diodes in the second bridge rectifier 67 are labeled D21, D23 and D25, the upper diodes are labeled D22, D24 and D26, and the switches 70 are labeled SW21, SW23 and SW25. The output control lines 48 from the controller 42 are connected to the gate inputs of the switching devices 62 and 70. The output lines 57 from the first secondary 54 are connected between upper and lower pairs of diodes 60 in the first rectifier bridge 58, and the output lines 65 from the second secondary are connected between upper and lower pairs of diodes 68 in the second rectifier bridge 67.

Figure 2:
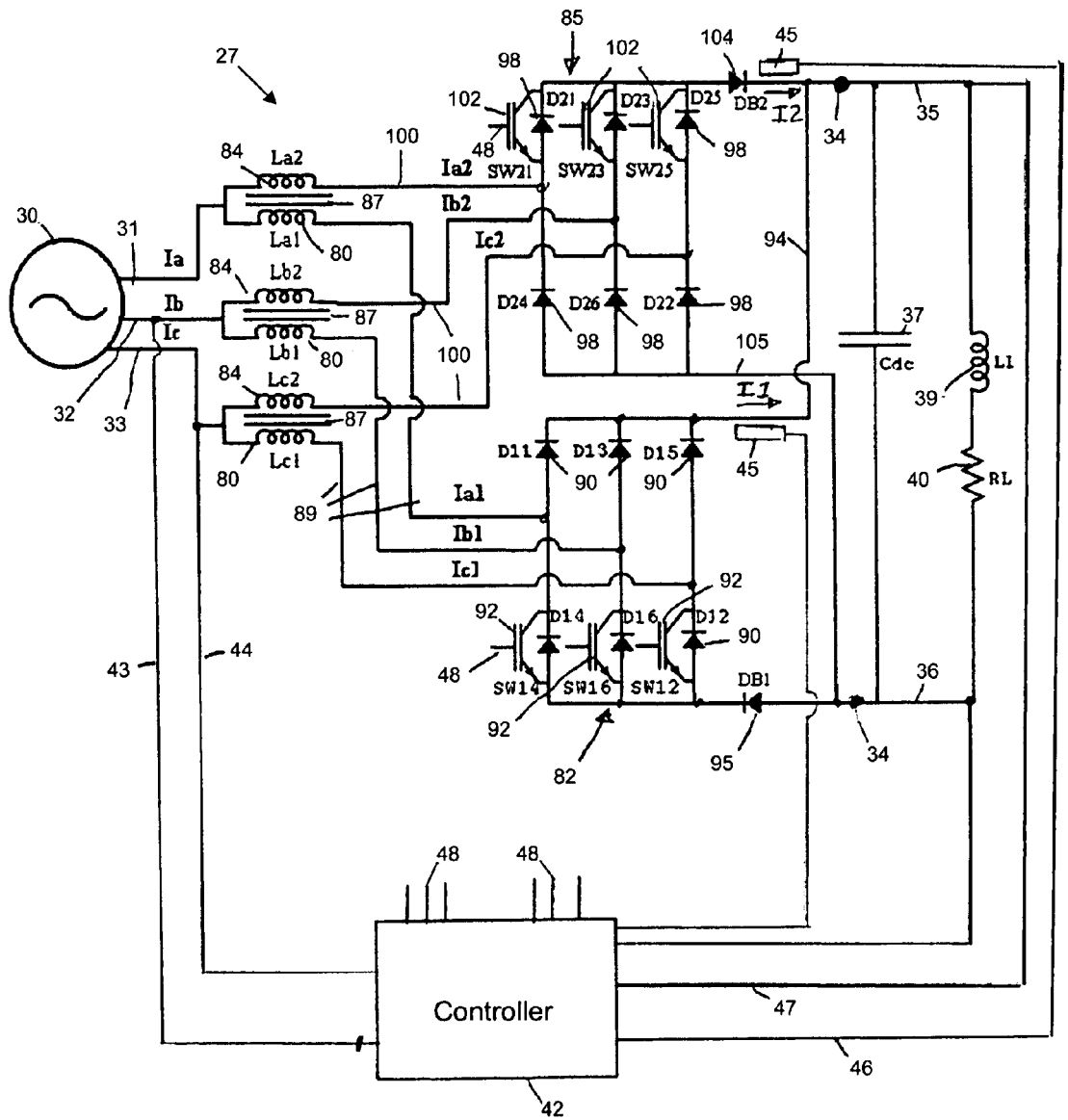
FIG. 2 is a schematic circuit diagram of another rectifier in accordance with the invention without an AC side isolation transformer.

In the non-isolated boost rectifier 27, the AC input lines 31, 32 and 33 are connected through inductors 80 to a first complementary bridge rectifier 82, and through inductors 84 to a second complementary bridge rectifier 85. The inductors 80 and 84 are shown in FIG. 2 as wound together on common cores 87, which is a preferred and convenient way of winding two inductors using a single core, but it is understood that the inductors 80 and 84 may be physically separate and not coupled with each other. AC power is provided through the inductors 80 on lines 89 to the first bridge rectifier 82. The bridge rectifier 82 includes six diodes 90 connected in a full bridge configuration, with one of the input lines 89 connected between each of the upper and lower pairs of diodes 90, and with three gate controlled switching devices 92 (e.g., IGBTs) connected in anti-parallel with the lower set of three diodes 90 that are connected to the lower DC bus line 36. The upper diodes 90 are connected via a conductor 94 to the upper DC bus line 35. To prevent circulating currents, a diode 95 is connected to the lower diodes 90 in the current path to the rectifier 82 to prevent current backflow from the rectifier 82 to the rectifier 85. The second complementary half-controlled rectifier bridge 85 is formed of six diodes 98 connected in a full bridge configuration, with input lines 100 connected to provide AC power to the bridge rectifier through the inductors 84, with one of the conductors 100 connected between each of the upper and lower series connected pairs of diodes 98 in the bridge rectifier 85. Gate controlled switching devices 102 (e.g., IGBTs) are connected in anti-parallel with each of the upper diodes in the rectifier 85. The IGBTs 102 are connected in a common collector configuration through a diode 104 (connected to prevent current backflow) to the output terminal 34 and thence to the upper DC bus line 35, and the lower set of diodes 98 in the upper rectifier are connected via a conductor 105 to the lower DC bus line 36. Thus, the bridge rectifiers 82 and 85 have their DC outputs connected in parallel across the output terminals 34 and the DC bus lines 35 and 36. The diode 104 and the diode 95 prevent circulating currents between the two parallel connected rectifier bridges 82 and 85.

For purposes of illustrating the operation of the boost rectifier 27 of FIG. 2, the upper three diodes 90 in the first bridge rectifier 82 are labeled D11, D13 and D15, the lower diodes 90 are labeled D12, D14 and D16, and the switching devices 92 are labeled SW12, SW14 and SW16. In the upper or second rectifier bridge 85, the upper diodes 98 are labeled D21, D23 and D25, the lower diodes are labeled D22, D24 and D26, and the switching devices 102 are labeled SW21, SW23 and SW25.

Figure 3:
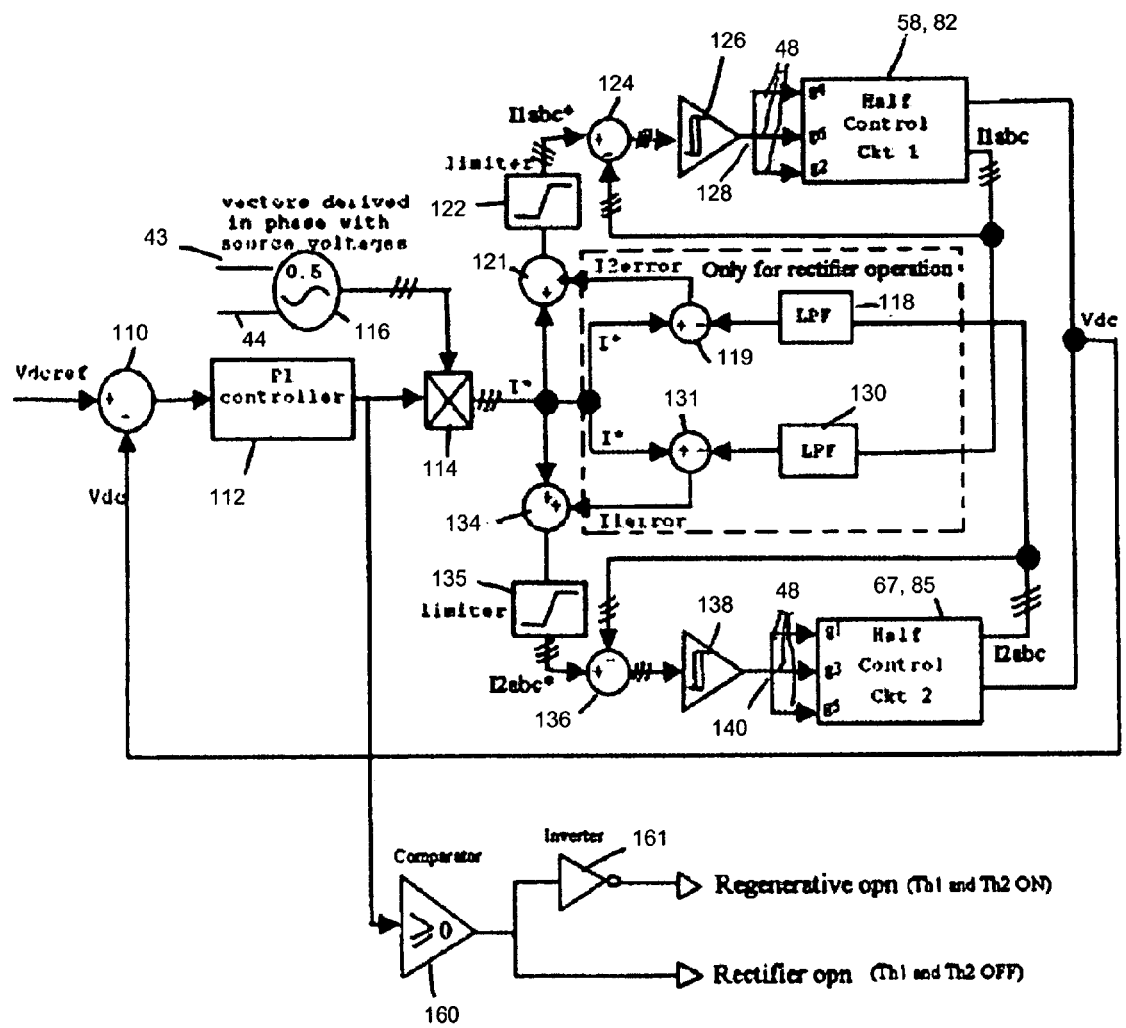
FIG. 3 is a block diagram showing an illustrative implementation of a controller for the rectifiers of FIGS. 1 and 2.

FIG. 3 is a block diagram of an embodiment of a controller 42 that may be utilized for the control of the switching devices in the boost rectifiers 25 and 27. The operation of the controller will be discussed in further detail below. In the exemplary controller 42 shown in FIG. 3, a voltage reference $V_{dcref}$ (the desired DC bus voltage) is provided to a summing junction 110 which also receives the actual measured DC bus voltage $V_{dc}$ from the lines 46 and 47. The difference between the reference voltage $V_{dcref}$ and $V_{dc}$ is provided to a proportional-integral (PI) controller 112, the output of which is provided to a multiplier 114 which also receives an AC voltage reference from a vector reference generator 116 that receives the AC input voltage waveform from the lines 43 and 44. The output I* from the multiplier 114 is provided to control loops that control the switching of the switching devices in the two complementary bridge rectifiers 58 and 67 or in the two complementary bridge rectifiers 82 and 85. The I2 measured current is provided through a low pass filter 118, the output of which is provided to a junction 119 that receives the reference I* from the multiplier 114, and the output of the junction 119 is the I2 error which is provided to a summing junction 121 that also receives the reference I*. The output of the summing junction 121 is passed through a limiter 122 and thence to a summing junction 124 which also receives the measured current I1. The output of the junction 124 is provided through a hysteresis controller 126 to a gate driver circuit 128 which generates the control signals on the lines 48 to switch the switching devices in the first bridge rectifiers 58 or 82. Similarly, the measured current I2 is provided through a low pass filter 130 to a junction 131 where it is subtracted from the reference I*, with the output of the junction 131, I1 error, provided to a junction 134 to be summed with I*. The output of the junction 134 is passed through a limiter 135 and thence to a summing junction 136 which subtracts the measured current I2. The output of the junction 136 is passed through a hysteresis controller 138 to a gate driver circuit 140 which provides the gate control signals on the lines 48 to the switching devices in the second bridge rectifier 67 or 85. The hysteresis controllers 126 and 138 are conventional elements and may be implemented in a conventional manner. An example of a commercially available hysteresis controller is the TPS5211 High Frequency Programmable Hysteretic Regulation Controller from Texas Instruments.

In a boost rectifier, inductors are normally used in series with the AC input phases in order to reduce the amplitude of the switching frequency harmonics of the system. In case of the complementary rectifier configuration of the present invention, two separate sets of line inductances are needed. Since the phase currents will contain appreciable lower order harmonics in a 3-phase half-controlled circuit, the inductors will incur extra losses. Also the system may be prone to have acoustic noise problems. These issues may be considered as potential drawbacks for the half-controlled configuration. However, the present invention enables a nearly sinusoidal current waveform to be achieved by combining the currents of the two half-controlled rectifier circuits. In such a situation it is advantageous to combine the inductances for the two half-controlled rectifier circuits through a common core. For an isolated version, the inductances can be combined with the line side isolation transformer 50 as shown in FIG. 1. For the non-isolated rectifier as shown in FIG. 2, the windings forming the inductances 80 and 84 can be wound on the same cores 87. By combining both of the AC side inductances on the same core, and given that their combined current waveform is nearly sinusoidal, the core loss and the core vibrations due to low order harmonics will be nearly eliminated.

It may be seen in FIG. 1 that two similar common emitter type half-controlled 3-phase rectifiers 58 and 67 are connected in parallel to the same DC bus lines 35 and 36 to supply a common RL load. On the AC side, the half-controlled bridge circuits 58 and 67 are connected to receive AC power from two separate complementary secondary windings 54 and 55 of the 3-phase isolation transformer 50. The line side inductances for the boost rectifier 25 are combined as part of the leakages of the secondary windings 54 and 55 of the transformer. The primary side 51 of the transformer 50 is connected via the input lines 31–33 to a balanced 3-phase AC source 30 (e.g., a generator or AC power mains). The AC side complementary isolation transformer 50 eliminates the possibility of circulating current between the two half-controlled rectifiers 58 and 67. The elimination of circulating current between the two half-controlled circuits is necessary for the half power rating operation of the devices as well as for efficient energy transfer from the AC side to the DC bus lines 35 and 36.

In the rectifier 27 of FIG. 2, two complementary type half-controlled bridge rectifier circuits (one common emitter type 82 and another common collector type 85) are connected in parallel via the output terminals 34 to the same DC bus lines 35 and 36 and to a common RL load. However, it may be seen that in the rectifier 27, no isolation transformer is used on the AC side. Instead the inductors 80 and 84 for the half-controlled rectifiers 82 and 85 are combined on the same cores 87. Also, to ensure elimination of the circulating current between the upper and lower half-controlled rectifiers, the diodes 95 and 104 are connected in series between the rectifier bridges 82 and 85 and before the parallel connection of the two bridges to the DC bus lines 35 and 36. If these diodes are not used, during some operating modes power will circulate between two half-controlled rectifiers instead of being converted from the AC to the DC side. This will unnecessarily burden the ratings of the diodes and switching devices and will increase the losses in the rectifier.

In each of the half-controlled 3-phase rectifier bridges 58, 67, 82 and 85, only three active switching devices (e.g., IGBTs) are used even though the number of diodes used is still six. A total of 6 switching devices and 12 diodes are needed for the rectifiers 25 and 27 compared to a conventional rectifier with 6 switches and 6 diodes. In addition, in the topology of the rectifier 27 of FIG. 2, two DC side diodes 95 and 104 are included so that the total number of diodes used is 14. Due to the bulky nature of the input transformer for rectifier applications, it is often preferred not to have a transformer, and in such applications the additional diodes 95 and 104 constitute a small fraction of the cost and bulk of the transformer that is not needed for the circuit of FIG. 2. It is understood that reference herein to diode or switching device in the singular can include multiple series or parallel connected diodes or switches which are combined to provide higher current or voltage rating (or both) than are available from a single device, where desired.

Although the component count of the systems of FIGS. 1 and 2 has increased because the two half-controlled rectifier bridge circuits are connected in parallel to the same load through a common DC bus, the total load will be shared equally by both of bridges. Hence, for a 1 pu (per unit) system load each of the two complementary bridges will share only 0.5 pu. Thus, all six active devices (58 and 67 in FIG. 1 and 82 and 85 in FIG. 2) need only be nominally rated for 0.5 pu power in the rectifiers 25 and 27. The power rating of the switches is thus reduced by 50% compared to a full bridge controlled rectifier where all six switches must be rated for 1 pu power. Also, the rating of the diodes will be reduced to 50% of the rated power of the combined system. As a result, the combined rating of the transistors in each half-controlled rectifier circuit can be only half the total rated power of the system, allowing much less expensive transistors and diodes to be used. Device costs may be expected to scale roughly in direct proportion to power rating. Thus, the 6 transistors required for the rectifiers 25 and 27 of the invention may be expected to be about half the cost of the 6 transistors of a conventional fully controlled rectifier. Although more diodes are needed for the rectifiers of the present invention, the ratings of these diodes will be lower (and the diodes thus less expensive) and the cost of diodes is generally much less than the cost of a switching transistor. In a conventional six switch rectifier, all of the diodes used are fast acting diodes. The rectifier 75 with isolation needs six switches and 12 diodes which are rated for half power. Only six of these diodes are fast acting diodes and the other six are line commutated diodes. Typically, the line commutated diodes are much less costly than fast acting diodes. Similarly, the non-isolated rectifier 27 has 6 switches and 14 diodes which are all half power rated. Only six diodes are fast acting and the other 8 are line commutated type.

The combination of two half-controlled rectifiers as shown in FIGS. 1 and 2 provides improved performance compared to a single half-controlled circuit. Furthermore, the rectifiers of the invention can achieve performance comparable to that of a conventional six switch active rectifier by using a cross-coupled control that provides nearly sinusoidal unity power factor interface with the main AC power system.

It can be seen in FIG. 1 that by employing a complementary configuration in the secondaries of the transformer 50, both of the half-controlled rectifier circuits 58 and 67 are achieved with common emitter switching devices. By doing so, the requirement for an isolated power supply for the IGBT gate drivers is eliminated. In addition, it may be seen from FIGS. 1 and 2 that the half-controlled rectifier circuits are shoot-through protected since each switching device is connected in series with a diode (and not another switching device), which is an important advantage of the rectifiers of the present invention over a conventional six switch active rectifier (in which two switches are connected in series across the DC bus lines). Because of this shoot-through protection, the rectifier of the invention does not require dead time delay, which further simplifies the gate drive circuit and also provides an important performance improvement compared to a regular six switch rectifier. The performance of a normal six switch rectifier is degraded appreciably at lower load due to the dead time that must be incorporated into its gate driver circuit. With the rectifier of the invention, this possibility is eliminated inherently.

As noted above, the efficiency of the rectifier of the invention is improved as compared to a conventional 6 switch rectifier, since the switches now carry only 50% of the rated peak current and thus the switching losses can be reduced considerably. To give a comparison, a detailed loss model of the semiconductor devices has been implemented. With the same semiconductor device loss model, the losses in the present rectifier and the losses of a conventional six switch rectifier are simulated dynamically and are compared as discussed further below.

Figure 4:
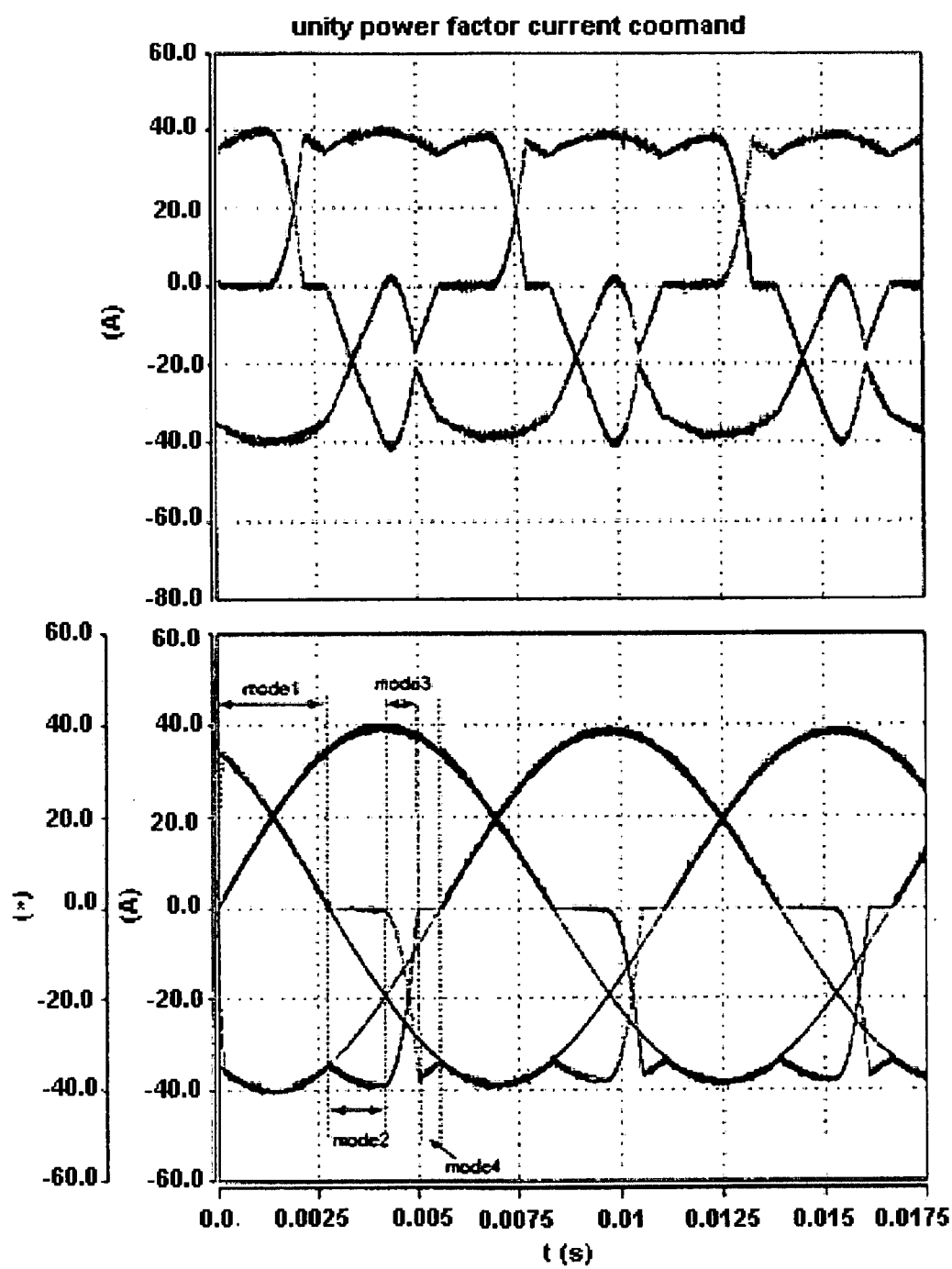
FIG. 4 are phase current and voltage waveforms of individual half-controlled rectifiers obtained from a simulation of the rectifiers of FIGS. 1 and 2 with unity power factor current commands. The errors (difference between the reference and actual currents) in phase currents of the lower half-controlled rectifiers are added with the raw reference currents of the complementary upper half-controlled rectifier and the combined waveforms are shown in the upper trace. These waveforms are used to illustrate the half-power rating capability of the circuits of FIGS. 1 and 2.

A typical simulation result of a 3-phase half-controlled rectifier 25 or 27 as in FIG. 1 or 2 for a unity power factor current command is given in the lower trace of FIG. 4. It can be seen from the figure that the operation of the rectifier can be divided into four operating modes. In mode 1 operation, all the three-phase currents Ia1, Ib1 and Ic1 (on the lines 57 or 89) are well controlled and the phase currents are following their sinusoidal reference currents. In this mode, two switches sw14 and sw12 (see FIG. 1 and FIG. 2, lower half-controlled rectifier 58 and 82) are regulated to control the current in their respective phases. In this case, the third phase current, which happens to be the phase B in this case, is also being regulated close to its reference value. If one considers the origin of this plot as 0 degrees, then mode 1 operation is spanned from 0–60 degrees as given in FIG. 4 until the current through phase C passes through zero.

At the 60 degree phase angle, the system enters mode 2 operation where both phase B and phase C references demand negative currents, whereas only sw14 is being regulated. At the same time it can be seen that both upper and lower half diodes corresponding to phase C (i.e. D15 and D12) are reverse biased and hence cannot conduct.

Thus, the current through this phase (ic1) will continue to be zero until the corresponding diode is forward biased. In this mode only the phase A switch (sw14) is being regulated and the current through phase B provides the return current path. Hence phase B will follow the same current waveform with reverse polarity as phase A during this mode. This mode of operation continues for the next 30° interval (i.e. 60°–90°) until diode D12 is forward biased. During this mode of operation it may be observed that both phase B and phase C currents deviate from their references with deviations of the currents in both the phases monotonically increasing until they reach their maximum (i.e. 50% of the individual rectifier peak current) at the 90° phase angle. Also, it may be observed that at this phase angle, both the phase B and phase C reference currents are the same and their magnitude is −0.5*lpk, which can be readily calculated to be lpk*sin(120+90)° and lpk*sin(240+90)° respectively. From the figure it can be observed that at 90°, phase B is actually carrying 50% more negative current than its reference value whereas phase C has a deficit of 50% negative current at the 90° point.

In the lower trace of FIG. 4, the period during 90°–120° is divided into two modes: mode 3 and mode 4. In mode 3, phase B and phase C encounter commutation overlap. The current through phase C builds up whereas the current through phase B decreases. The overlap period continues until the current through phase B reduces to zero. In a manner similar to a regular 3-phase diode bridge or SCR bridge, the overlap period here depends upon the line inductance value and the magnitude of current at the start of commutation. After phase B current reaches zero, the system enters mode 4 operation where the current through phase B will remain at zero and phase C will experience a similar magnitude of current as phase A but with negative polarity. This mode of operation will continue until 120°, at which mode 1 operation will again be entered and the cycle will be repeated.

It can be noted that at the start of mode 3 the errors in phase B and phase C currents monotonically decrease, and at the beginning of mode 4 the polarities of the errors change their directions and the differences between the actual currents and reference currents of phase B and phase C are always well below the maximum deviation (50% of the individual rectifier peak current) as observed earlier during mode 2 operation.

From the above discussion, it can be concluded that the maximum errors in phase currents with unity power factor current command is limited to 50% of the rated peak value of each half-controlled rectifier. Also, it can be observed that when only phase A current is being actively regulated, the errors in currents through phase B and phase C are always opposite in nature. In addition, the errors in phase B and phase C will be of equal magnitude in the absolute sense for the reasons discussed below.

Since the sum of the currents in all three phases of an individual rectifier is always zero and only phase A current is being actively regulated, the sum of the currents through phase B and phase C will be equal and opposite to the magnitude of phase A current. Hence, if there is any error in current through phase B that error has to be offset by a similar error by phase C and the errors must be of opposite sign in order to preserve Kirchoff's current law. Hence, in order to track sinusoidal reference currents in phases B and C, an external circuit is needed which will be capable of subtracting a maximum 50% negative current in phase B and supplying a maximum of 50% negative current in phase C. For this purpose, the second complementary half-controlled bridge 67 or 85 as shown in the upper half of FIGS. 1 and 2 can be employed.

The operation of the complementary rectifier bridge 67 or 85 is the same as the operation of the rectifier bridges 58 and 82 except that the current waveforms are controlled sinusoidally during their negative halves. Thus, during mode 2 operation as explained above, both phase B and phase C currents in the complementary half-controlled rectifier 67 or 85 will be controlled by regulating their respective switches (sw23 and sw25) and the currents through these phases will follow their references. By observing FIG. 4 it can be inferred that phase B and phase C will carry exactly half of the negative peak currents at the 90° point. Thus, both the phases will have the potential to carry additional 50% current without exceeding the current limit of their respective switches.

It was explained above that the maximum errors in the lower half phase B and phase C currents (i.e. ib1 and ic1) during this mode are also limited to 50% of the peak current. Therefore, if one adds up the errors in phase currents of the lower half-controlled rectifier to the respective phase currents of the complementary upper half-controlled rectifier, then the combined waveforms will assume the waveshapes given in the upper trace of FIG. 4. It may be seen that the magnitude of the combined waveforms remains restricted within an envelope of 40 A peak to peak current, which is considered as the peak rated current of an individual half-controlled rectifier for the present analysis. Hence, if one maintains regulated phase currents in the complementary upper half configuration as given in the upper trace of FIG. 4, effectively the harmonics drawn by the lower half rectifier 58 or 82 will be "cleaned up" satisfactorily without exceeding the current limits for the upper half complementary rectifier 67 or 85.

If it is assumed that the lower or first half-controlled rectifier 58 or 82 is operating either in mode 2, 3 or 4, it can be found from FIG. 4 that the upper or second half-controlled rectifier 67 or 85 will operate in mode 1 during this interval because of their complementary nature. Hence, in the lower half rectifier only the phase A switch, SW14, is modulated; on the other hand, for the upper half-controlled rectifier both phase B and phase C switches (SW23, SW25) are modulated. Thus, during this mode the upper half-controlled rectifier will follow the reference current set for it for all the three phases, whereas the lower half-controlled rectifier will encounter errors in phase B and phase C currents. As explained above, the errors in individual phases never exceed more than 50% of the individual peak limit and the errors in phase B and phase C are always almost equal and opposite in nature. Hence, the sum of the errors will always be close to zero. Since the errors in phase current of the first half-controlled rectifier will be compensated by the complementary second half-controlled rectifier, the additional currents in phase B and phase C through the second half-controlled rectifier will be limited to 50% of the individual rated peak value. Because the summation of all three phase currents of each individual rectifier is zero, the phase A of the upper (second) half-controlled rectifier will also carry an additional current equivalent to the sum of additional currents in phase B and phase C. Also, since the direction of errors in phase B and phase C currents are opposite in nature and their sum is close to zero, it is very likely that the phase A current will also remain within the individual rated peak value (i.e. 50% of the rated rectifier peak current). Thus, it can be seen that in the rectifier of the present invention, the currents through all the switches as well the diodes need to be rated for only 50% of the rated value of the rectifier as a whole.

By employing a similar method the ripple due to the upper (second) half-controlled rectifier can be "cleaned" by the lower (first) half-controlled rectifier without overshooting the current limits of the upper half-controlled rectifier. Hence, a unity power factor interface is possible in accordance with the invention by employing two half-controlled rectifiers in complementary fashion satisfying the condition that currents through individual rectifiers be limited to their peak rated currents, i.e., half of the combined peak current of the upper and lower half rectifiers. Thus, with the rectifier topology of the present invention, unity power factor interfacing is possible with six half power rated active devices and twelve half power rated diodes.

Figure 5:
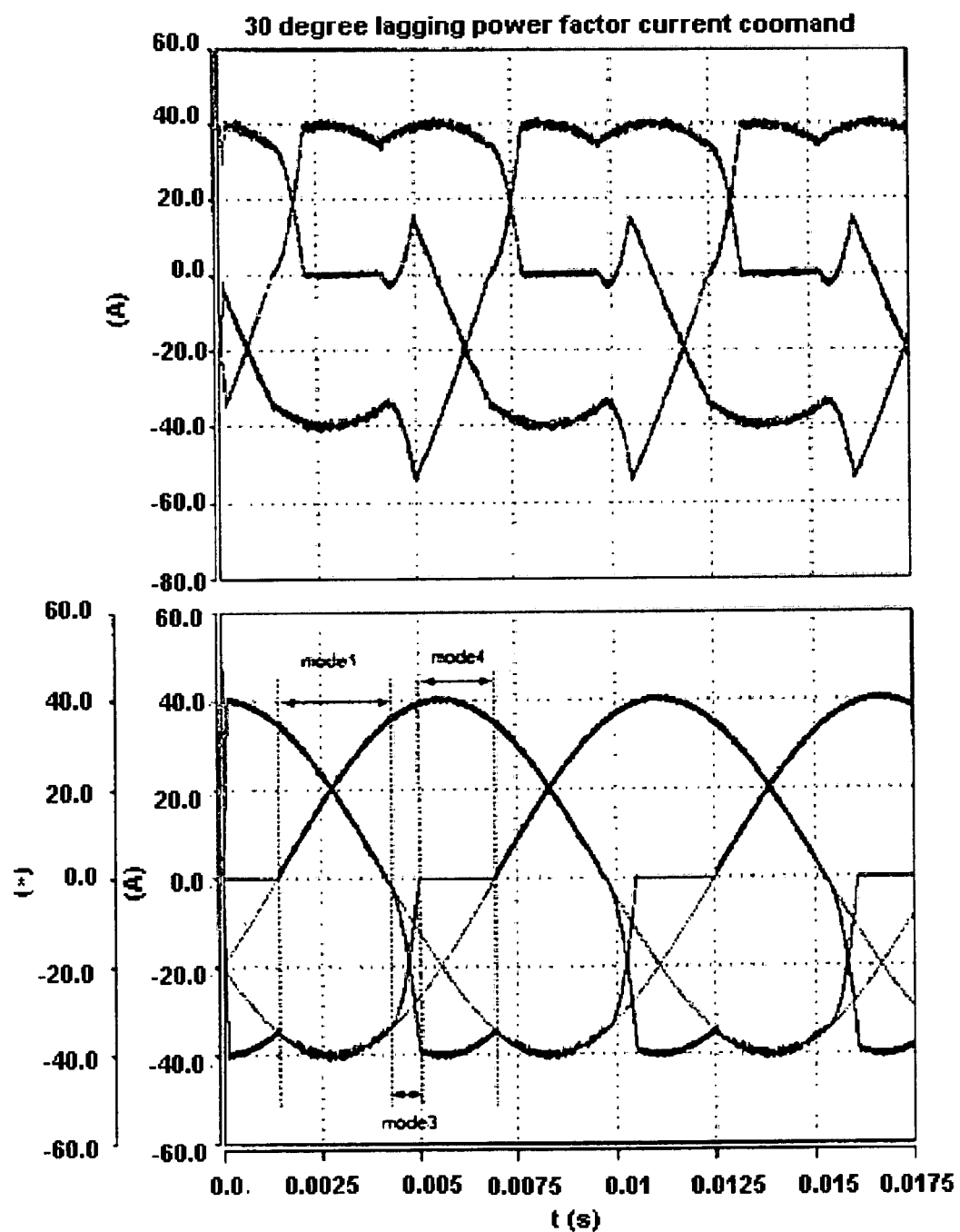
FIG. 5 are phase current waveforms of an individual half-controlled rectifier, the raw reference currents for each phase, the actual reference currents (the summation of errors in lower half-controlled rectifier and the raw reference current waveforms of the upper half-controlled rectifiers) for the complementary half-controlled rectifier of FIGS. 1 and 2 with a 30° lagging power factor current command.
Figure 6:
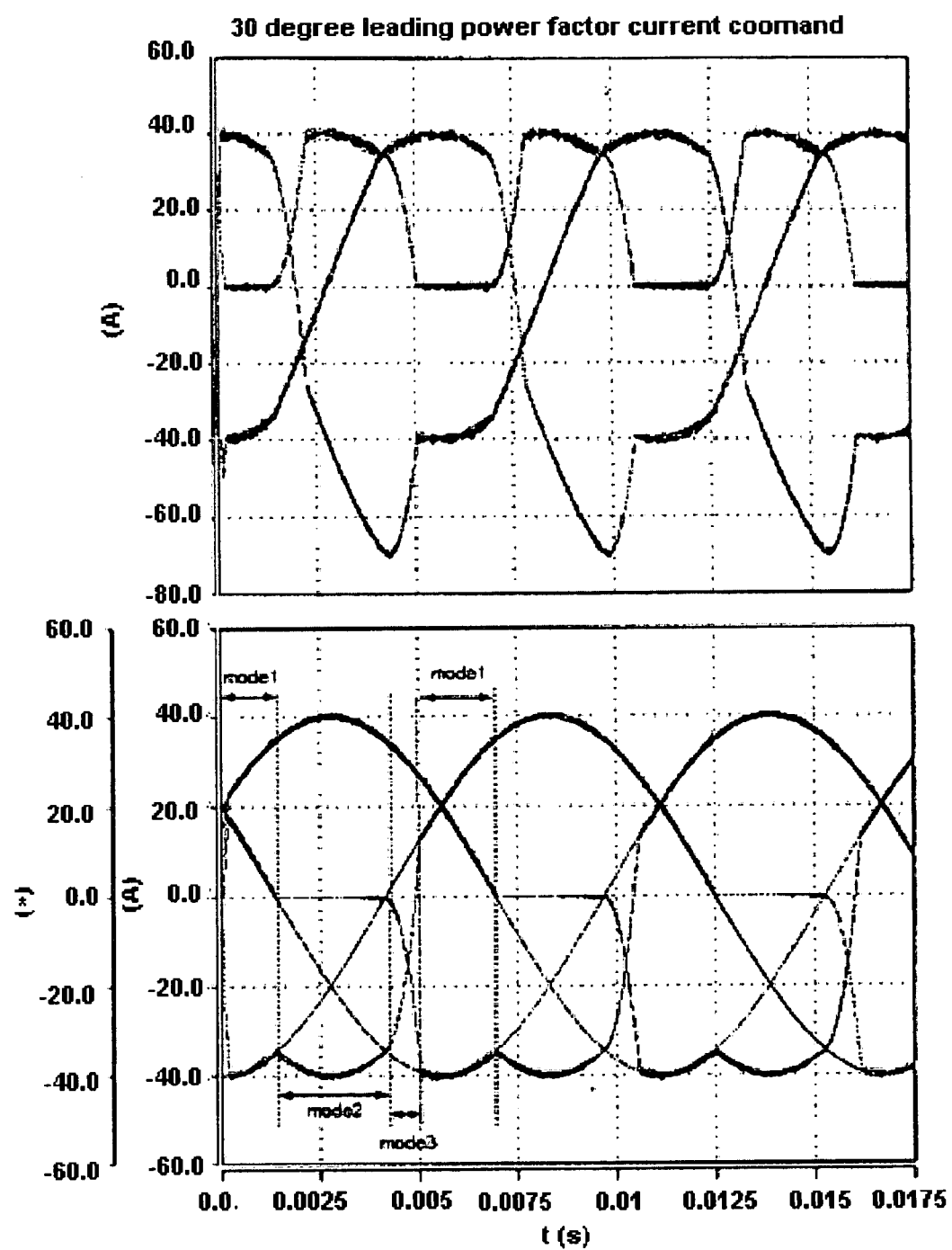
FIG. 6 are phase current waveforms, raw reference current waveforms and the actual reference currents for the complementary half-controlled rectifiers of FIGS. 1 and 2 with a 30° leading power factor current command.
Figure 7:
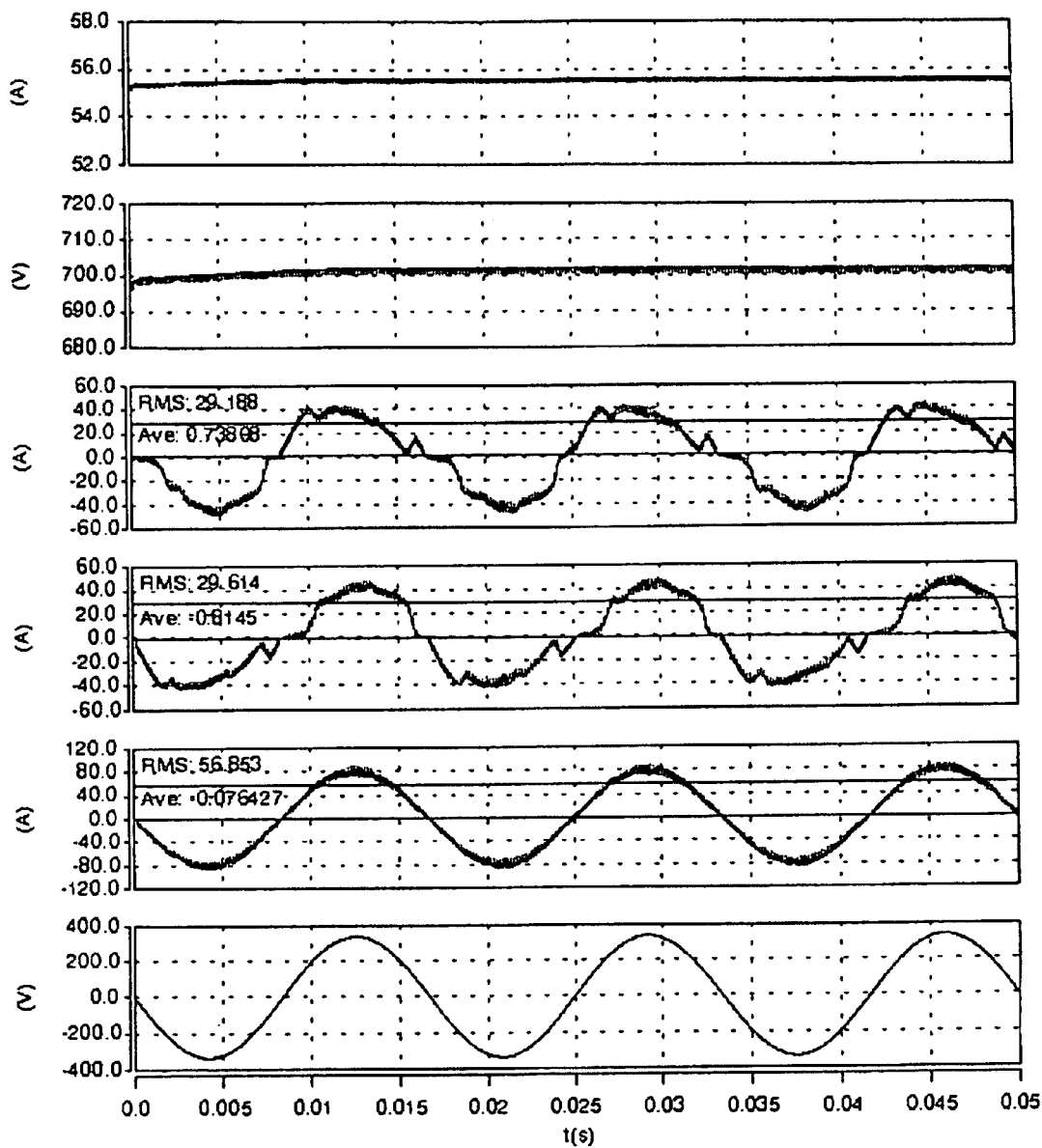
FIG. 7 are voltage and current waveforms from a simulation of the rectifiers of FIGS. 1 and 2 at a simulated full load (40 kW).

The rectifier 25 or 27 allows the use of half power rated devices when unity power factor current commands are used. If a system demands either lagging or leading power factor current commands, then the half power rating active devices will either not support such operation or it may be supported with degraded performance. This phenomenon can be explained with the help of FIGS. 5 and 6 where the current references for the rectifiers 25 and 27 is shown for 30 degree lagging and 30 degree leading power factor current commands operation. In both cases, the current waveforms for a typical half-controlled configuration are given in the lower traces. The error in phase currents (reference-actual) are then added with the currents of a complementary half-controlled configuration and the resulting waveforms are plotted in the upper traces. The process is same as explained for the case of a unity power factor current command as in FIG. 4. It can be seen from both FIGS. 5 and 6 that the upper trace waveforms exceed the limits of the 40 A envelope. This fact implies that the switch currents in the complementary configuration are required to exceed the assumed 40 A limit for satisfactory performance. Thus, half power rated active devices are not sufficient for lagging or leading power factor currents commands. Also, it is evident from the lower traces in FIGS. 5 and 6 that some of the operating modes explained for unity power factor commands in FIG. 4 do not exist in these cases.

Estimation of losses in any power electronic circuit is an important consideration. For proper functioning of the semiconductors and good packaging, thermal design plays an important role. The losses incurred in different semiconductor modules and power electronics components need to be dissipated efficiently so that the junction temperature of the devices does not cross a certain threshold. Therefore, for proper thermal design, detailed loss modeling of the semiconductor devices is desirable.

In general, the device manufacturer supplies device loss characteristics for different operating conditions such as during Turn-on, Turn-off, and the on-state voltages during conduction. The characteristics are complex in nature and depend on parameters such as junction temperature, operating DC bus voltage, current through the device, etc. The loss characteristics for SKM300GB123D IGBTs have been fitted with a suitable curve using MATLAB, and the coefficients of fitted curves are used to obtain a complete loss model for the rectifier. Based on the above fit-curve of losses and on-state voltages of IGBTs and diodes, a detailed loss model has been developed using the SABER MAST MODEL and is included in the dynamic simulation of the system. During dynamic operation, the DC bus voltage, instantaneous phase currents and the switching logics are considered as the input for the loss model. Based on the switching logic status, the occurring of transients like switching on, switching off, or the status of different switching components of the rectifier are decided. The turn on and turn off losses of an IGBT and turn off losses of diodes are found as a function of current and dc bus voltage from the fit curve. Similarly, the instantaneous on-state voltages of the diodes and IGBTs are also found as a function of current through them. The on-state voltages are then multiplied by current, yielding the instantaneous conduction loss. These losses when integrated over a specified time result in the total conduction loss. Summation of turn on loss, turn off loss, and conduction loss of each of the elements gives the total loss of a phase leg of the rectifier. Similarly, summing up the losses in all phase legs provides the total loss of the rectifier. The detailed loss modeling used can be found in Bernet et al., "A Matrix Converter Using Reverse Blocking NPT-IGBTs and optimized pulse patterns," IEEE Power Electronics Specialists Conference, June 1996, Vol. 1, pp. 107–113.

The following discusses the control strategy for the complementary bridge rectifiers 25 and 27 with common DC bus control with reference to FIG. 3. Since both of the half-controlled rectifier circuits 58, 67 and 82, 85 are connected to a common DC bus 35, only one DC bus voltage sensor is sufficient (in contrast to a multiple DC bus link application). In the control scheme of FIG. 3, the outer loop is regarded as DC bus voltage control loop. The PI controller 112 is used for regulating the DC bus voltage. The output of the PI controller decides the amplitude of the current through phases. This amplitude, when multiplied at 114 with sinusoidal unit vectors derived in phase with the phase voltage, gives the combined current references I* for each phase of the primary side of the transformer. However, the reference current for each complementary configuration is one-half of the combined reference currents. Thus, the combined reference currents multiplied by 0.5 gives the reference currents for the phases of the individual half-controlled rectifier bridges.

In the half-controlled rectifier circuits 58, 67 and 82, 85, the current of each phase can follow the references only through one-half cycle, whereas the other half cycle current remains uncontrolled and therefore can not always follow the reference. In such a case, the complementary side rectifier bridge that is in its controlled half cycle can compensate for the error due to its counterpart rectifier bridge which is uncontrolled. In the controller of FIG. 3, an active filter type control configuration is utilized with the current references generated from the voltage controller. It can be seen from FIG. 3 that the individual rectifier reference currents I* are added at 121 and 134 to the error of the complementary half-controlled rectifier (I1error or I2error) to generate the final current references for the individual half-controlled rectifiers. The current references through each phase of both the rectifiers are limited to half of the peak rated current by the limiters 122 and 135. The current controllers used are conventional hysteresis current controllers 126 and 138. Depending upon the direction of the errors between the reference current and actual feedback currents through the phases, the switching of the devices can be executed. Low pass filters 118 and 130 are used in the feedback path of the measured currents I1 and I2 in order to avoid switching frequency harmonics affecting the dynamics of the controller.

The operation and control strategy for both the isolated and non-isolated type half power rating rectifiers 25 and 27 shown in FIGS. 1 and 2 are identical. In both cases, the current control is realized with a hysteresis controller 126 and 138. A PI controller generally cannot be used for the current regulator because the half-controlled circuits are only controlled in one half of the cycle, and hence a PI controller would become saturated.

A 40 kW 3-phase 3-wire 415V, 60 Hz system with a 700 V DC bus has been simulated in SABER along with an RL load. Logic BJTs and power diodes available from SABER templates were used for simulating the rectifier power circuit. An inductance of 1 mH in the AC side is used for each phase of each half of the rectifiers. For the isolated type rectifier, the inductance is included as the leakage inductance of the transformer. A 3300 $\mu$F DC bus capacitor with an ESR of 0.015 ohms is considered in the above simulation. The resistance and inductance used for full load in the DC side are 12.25 ohms and 100 nH respectively. Since the operating principle and control algorithms for both the circuits 25 and 27 (FIG. 1 and FIG. 2, respectively) are exactly the same, the performance and the waveforms in both the circuit are expected to be the same and the results shown are applicable for both topologies.

The results of the simulation in steady-state operation and during transient operation of the rectifier with appropriate legends are presented in FIGS. 7–12. It can be seen from the simulation results that even though the currents through the individual half-controlled rectifier circuits (ia1 and ia2 in FIGS. 7, 10 and 11) are distorted, their combined waveforms (ia, ib and ic) are smooth and nearly sinusoidal. Also, the combined currents are in phase with their respective source voltages (see FIGS. 7, 10 and 11). Thus, unity power factor interface of the system is achievable at any load value from no load to full load. The DC bus voltage $V_{dc}$ is also very smooth and does not show appreciable distortion (see FIGS. 7, 10 and 12). Hence, it is apparent that the controller successfully eliminates the lower order harmonics on both the AC side and the DC side of the rectifier.

Figure 8:
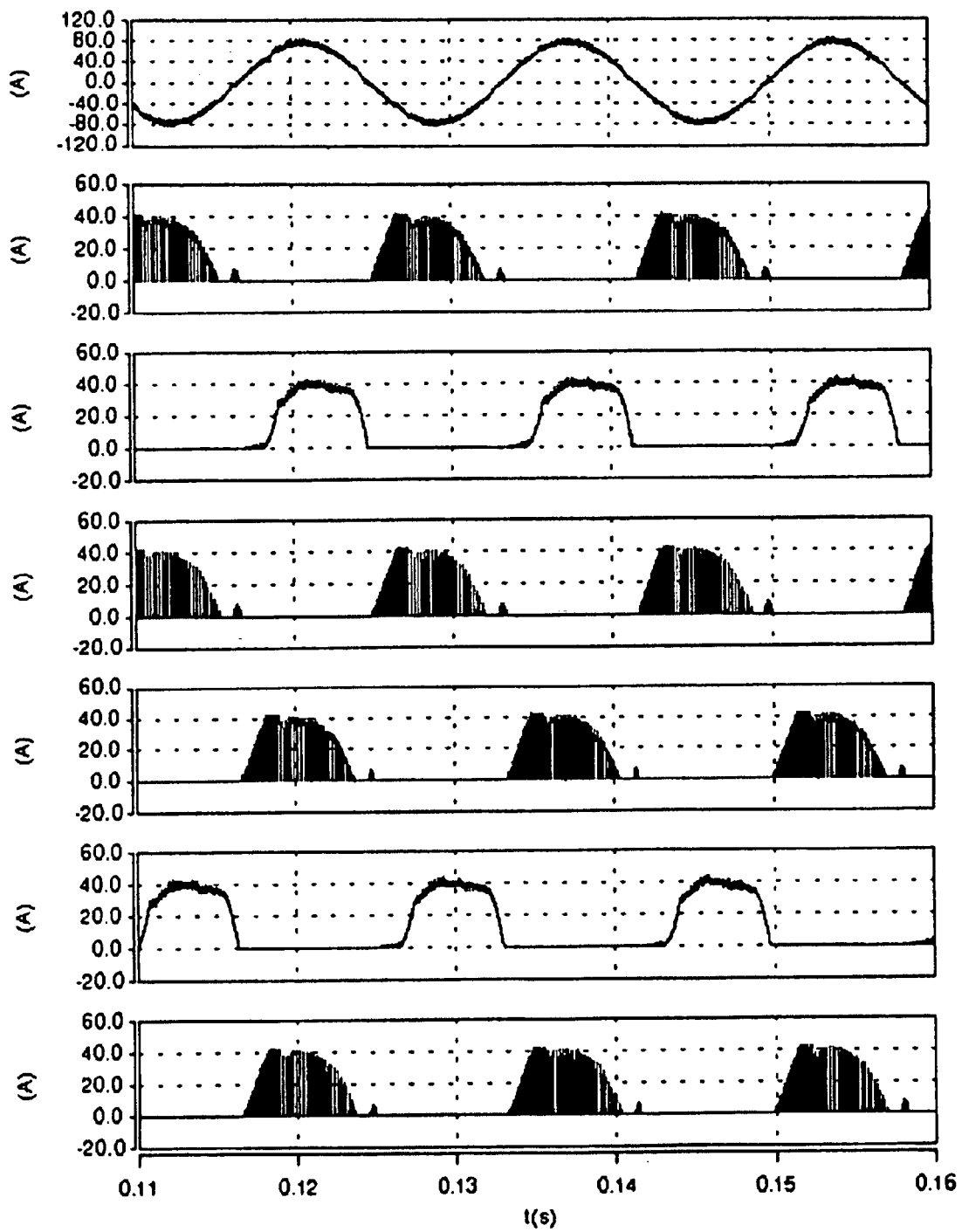
FIG. 8 are current waveforms through different components at full load for a simulation of the rectifiers of FIGS. 1 and 2.

The currents through the different semiconductor components for both the upper and lower half rectifier of phase A at rated load are shown in FIG. 8. The trace demonstrates that the currents through the switches i(sw14), i(sw24) and through diodes i(d12), i(d24) are switched in nature and are limited to only 40 A, which is one-half of the peak phase current 80 A when the system operates at full load (40 kW). Hence, the rectifier successfully reduces the rating of the semiconductor devices to 50% of the rated value without sacrificing the performance of the system. In order to compare the legends in the plots, reference should be made to the schematic of the rectifiers 25 and 27 in FIGS. 1 and 2.

The lower half anti-parallel diodes (i(d14) and i(d24)) of each half-controlled rectifier also show almost the same peak current (40 A) as that of the switches sw12, sw24. However, it may be observed (see FIGS. 8 and 9) that these anti-parallel diodes conduct for one half cycle and their currents are zero for the other half cycle. Thus, these diodes do not experience switching current, and it may be expected that the switching (turn-off) losses of these diodes are almost zero, so that the total switching loss of these diodes and the switches are expected to be less with the present rectifier than in conventional six switch controlled rectifiers.

Figure 9:
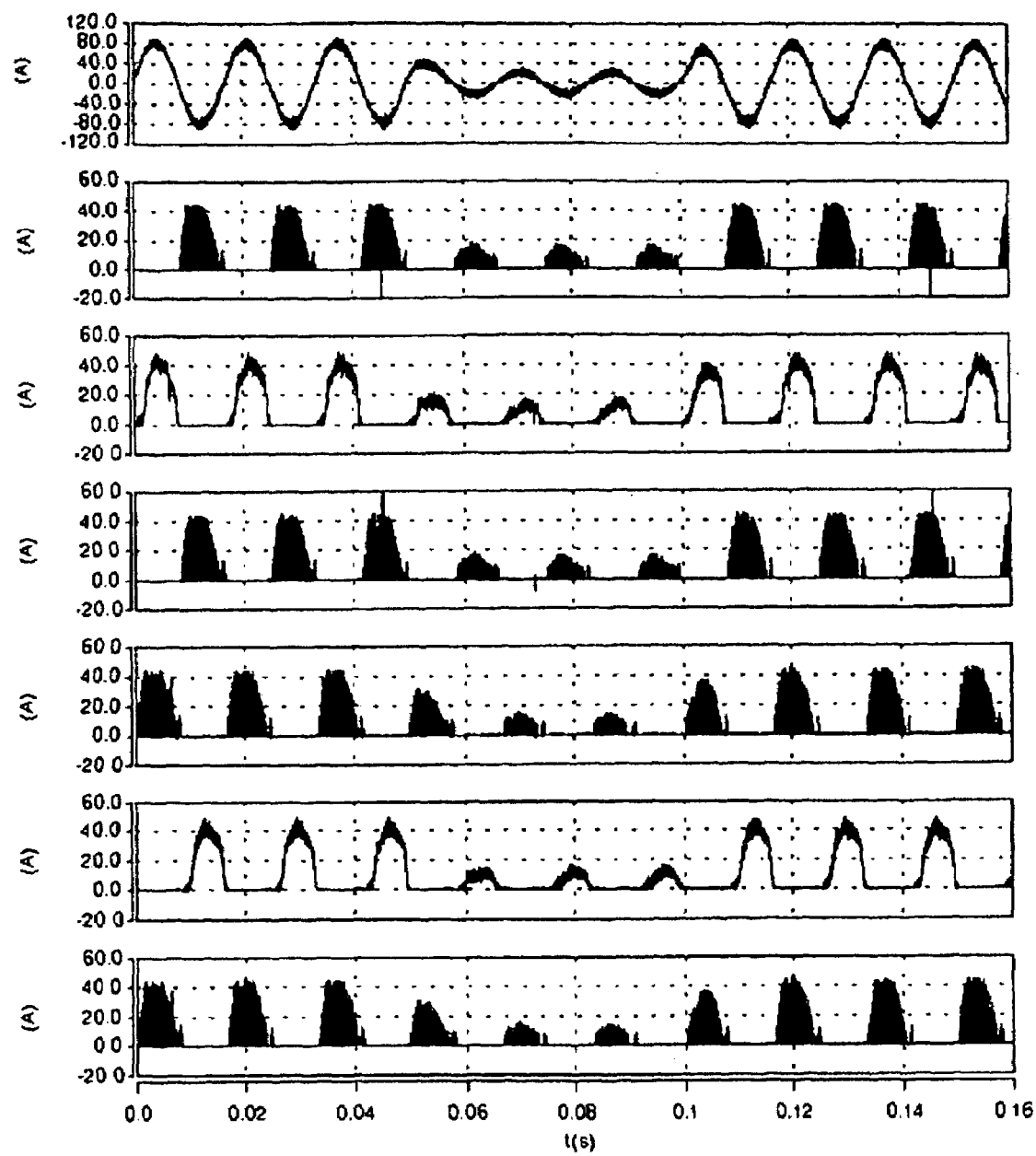
FIG. 9 are waveforms of current through different components during load transition from 100% to 25% and vice versa for a simulation of the rectifiers of FIGS. 1 and 2.
Figure 10:
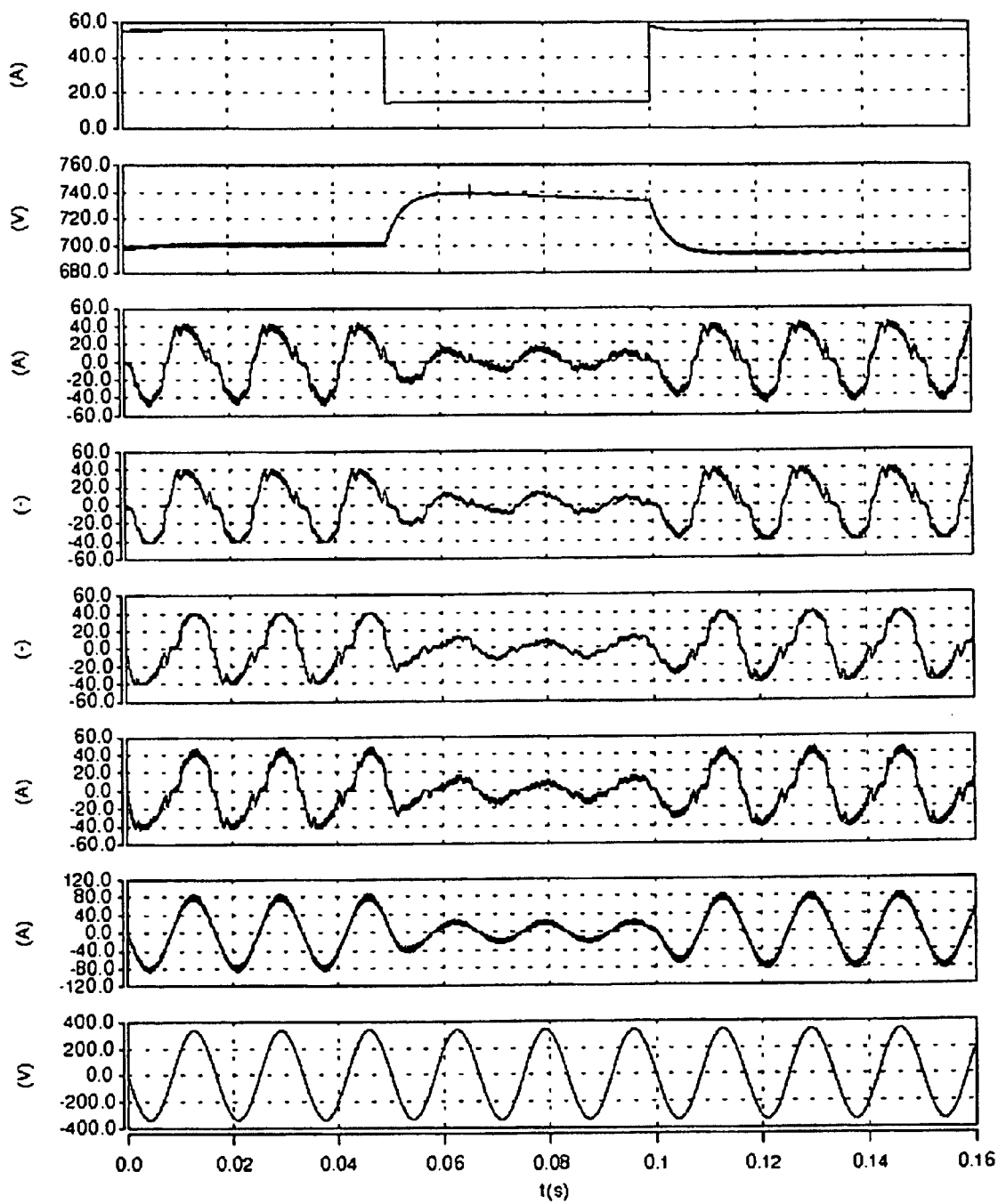
FIG. 10 are waveforms of currents and voltages from a simulation of the rectifiers of FIGS. 1 and 2 during load transition from 100% to 25%.

The rectifier 25, 27 is simulated for a DC side load transition from 100% to 25% load, and vice versa, and the corresponding simulation results are given in FIGS. 9 and 10. It may be seen that the configuration works well both in steady-state and during transients, and the current waveforms on the primary side are always sinusoidal and maintain unity power factor. At the same time, the current through the semiconductor components (switches as well as the diodes) remain within 40 A, which is 50% of the rated current.

Figure 11:
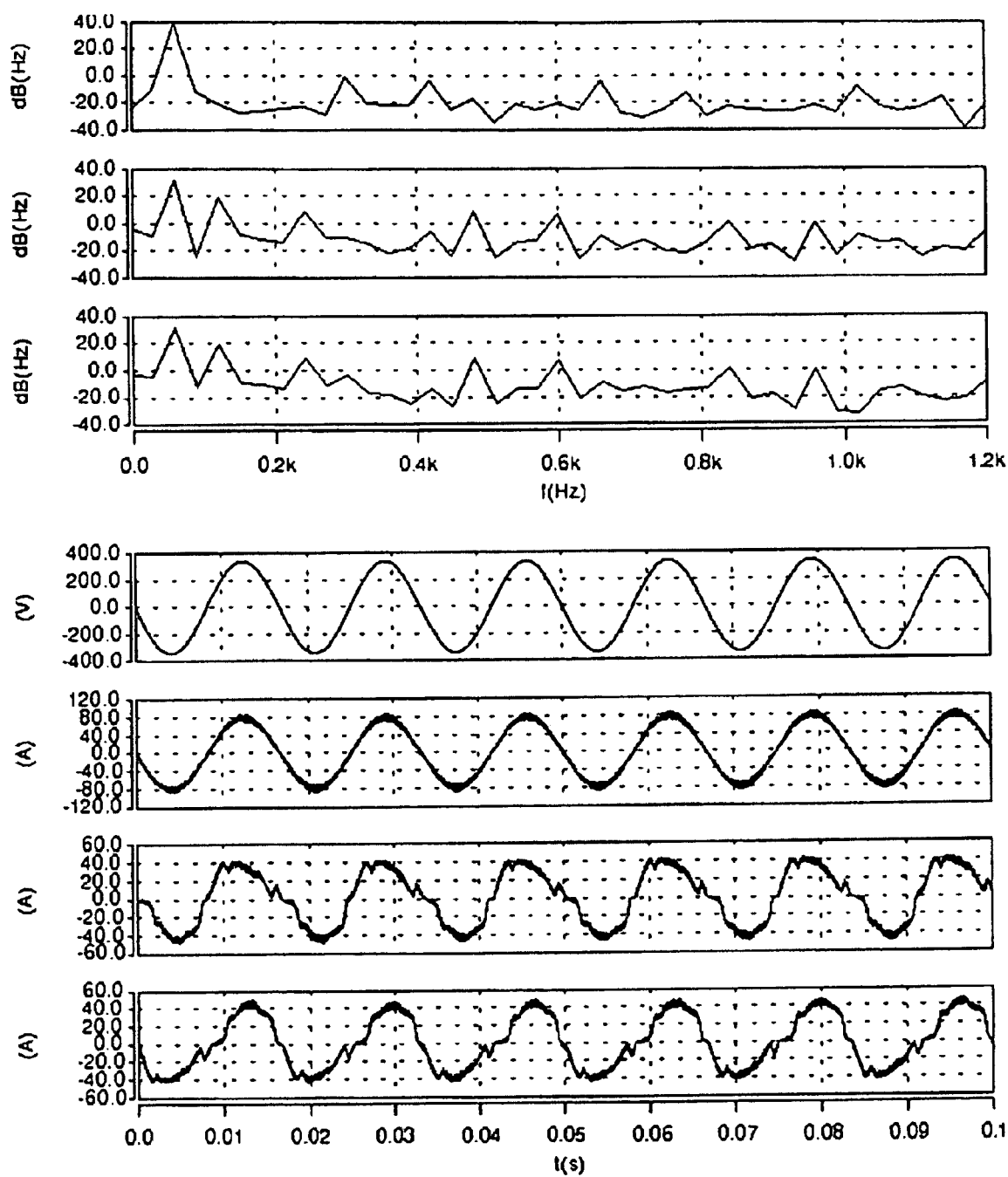
FIG. 11 are waveforms of the phase currents for simulations of the rectifiers of FIGS. 1 and 2 along with their combined current waveform and corresponding FFT when operating at full load.
Figure 12:
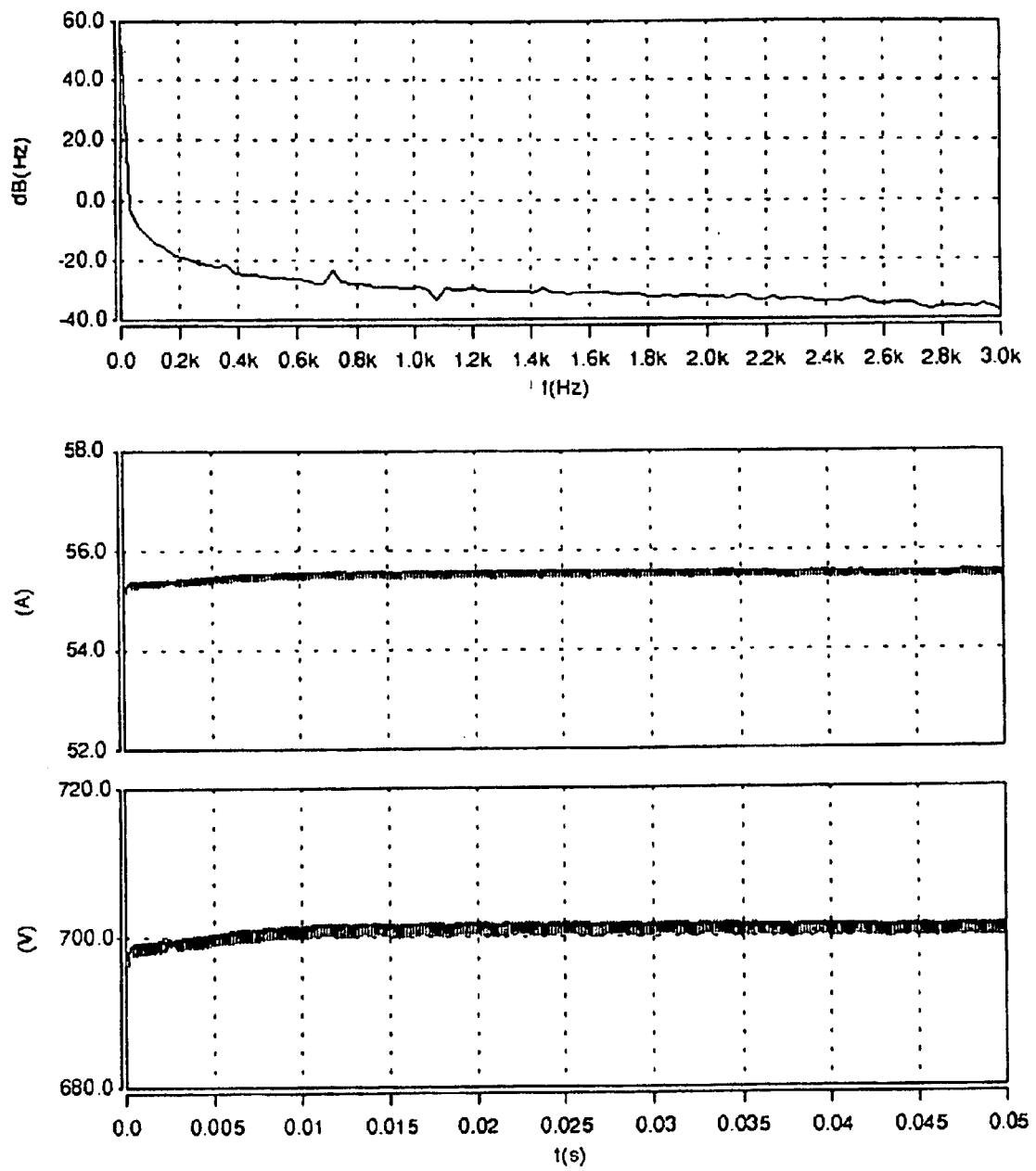
FIG. 12 are waveforms for a simulation of the rectifier of FIGS. 1 and 2 showing load current, DC bus voltage (VDC) and the corresponding FFT, when operating at full load.

In order to show the rectifier in comparison to a multiple DC bus topology, the results of individual phase currents (ia1, ia2), their combined current waveform (ia) and the DC bus voltage along with their FFTs are given in FIG. 11 and FIG. 12, respectively, for a full load condition. It can be observed that the combined current waveform as well as the DC bus voltage are almost free from lower order harmonics even though the individual phase currents (ia1, ia2) have considerable lower order even harmonics.

Figure 13:
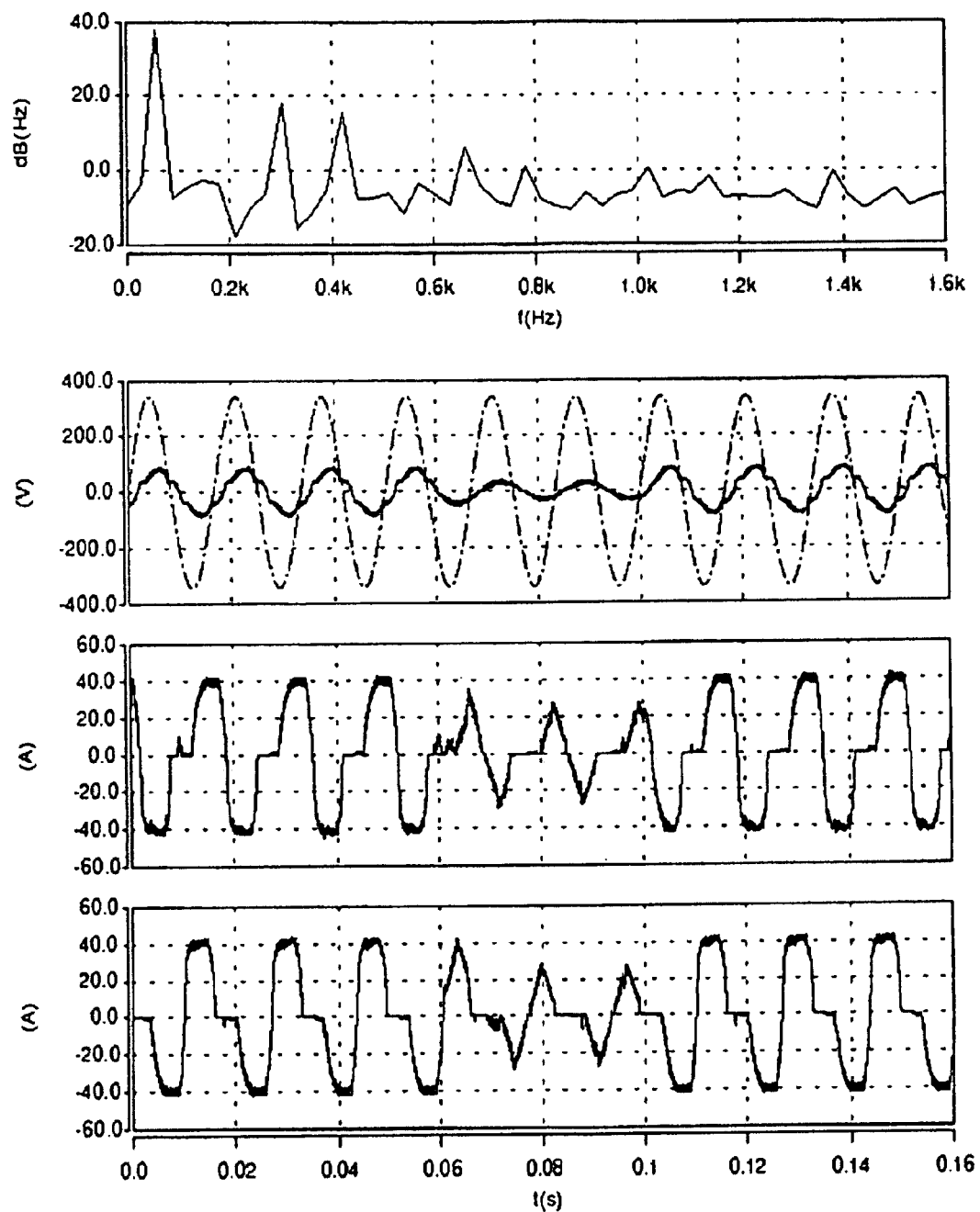
FIG. 13 are voltage and current waveforms and a corresponding FFT from a simulation of the rectifier of FIGS. 1 and 2 with 45° lagging power factor current command.
Figure 14:
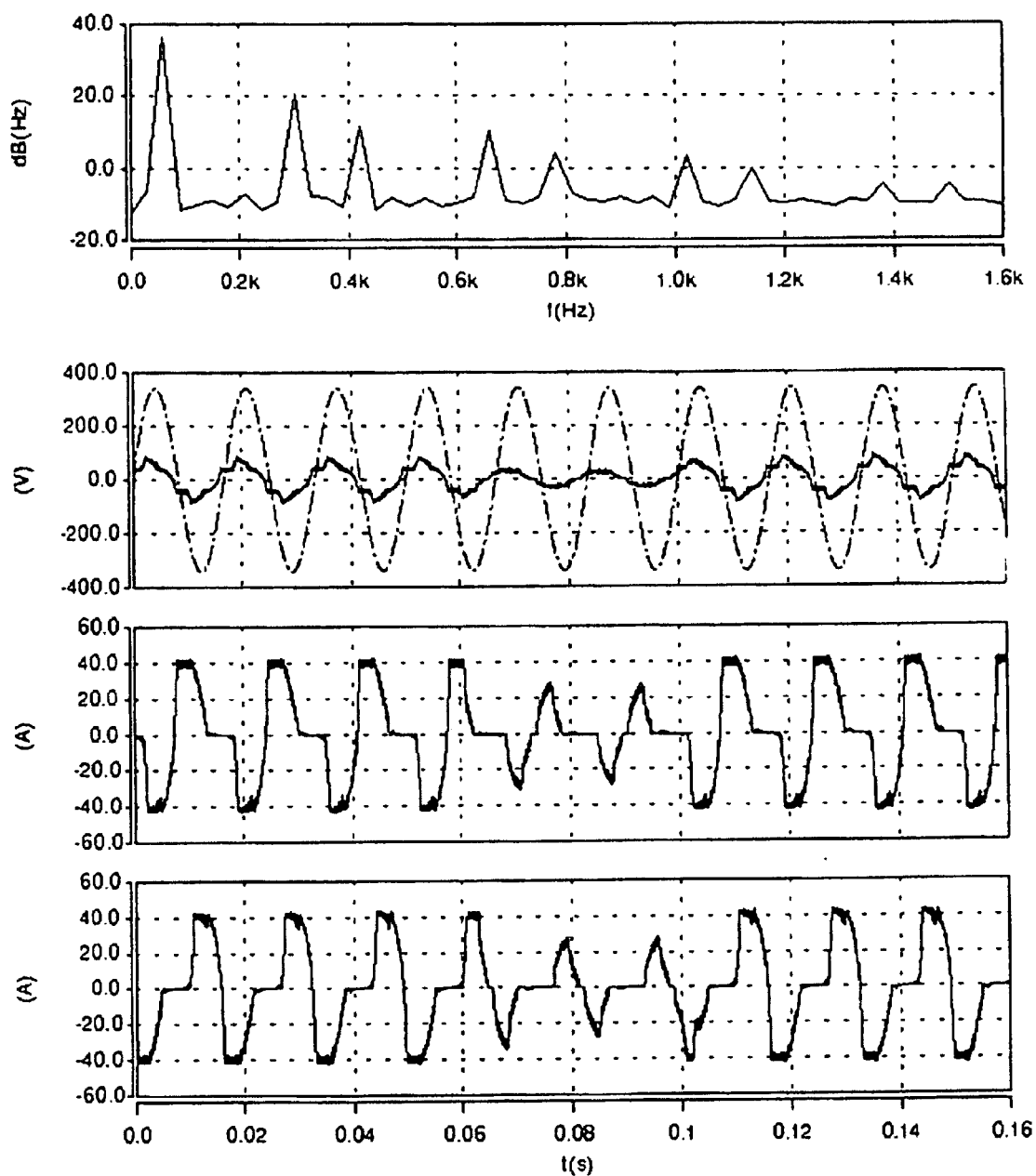
FIG. 14 are current and voltage waveforms and the corresponding FFT for a simulation of the rectifier of FIGS. 1 and 2 with 45° leading power factor command.

The rectifier was also simulated for 45 degree lagging and 45 degree leading power factor current commands and the results are plotted in FIGS. 13 and 14 respectively. It may be seen that the current waveforms are distorted. However, this is not considered a disadvantage since in most cases unity power factor operation is desired.

Figure 15:
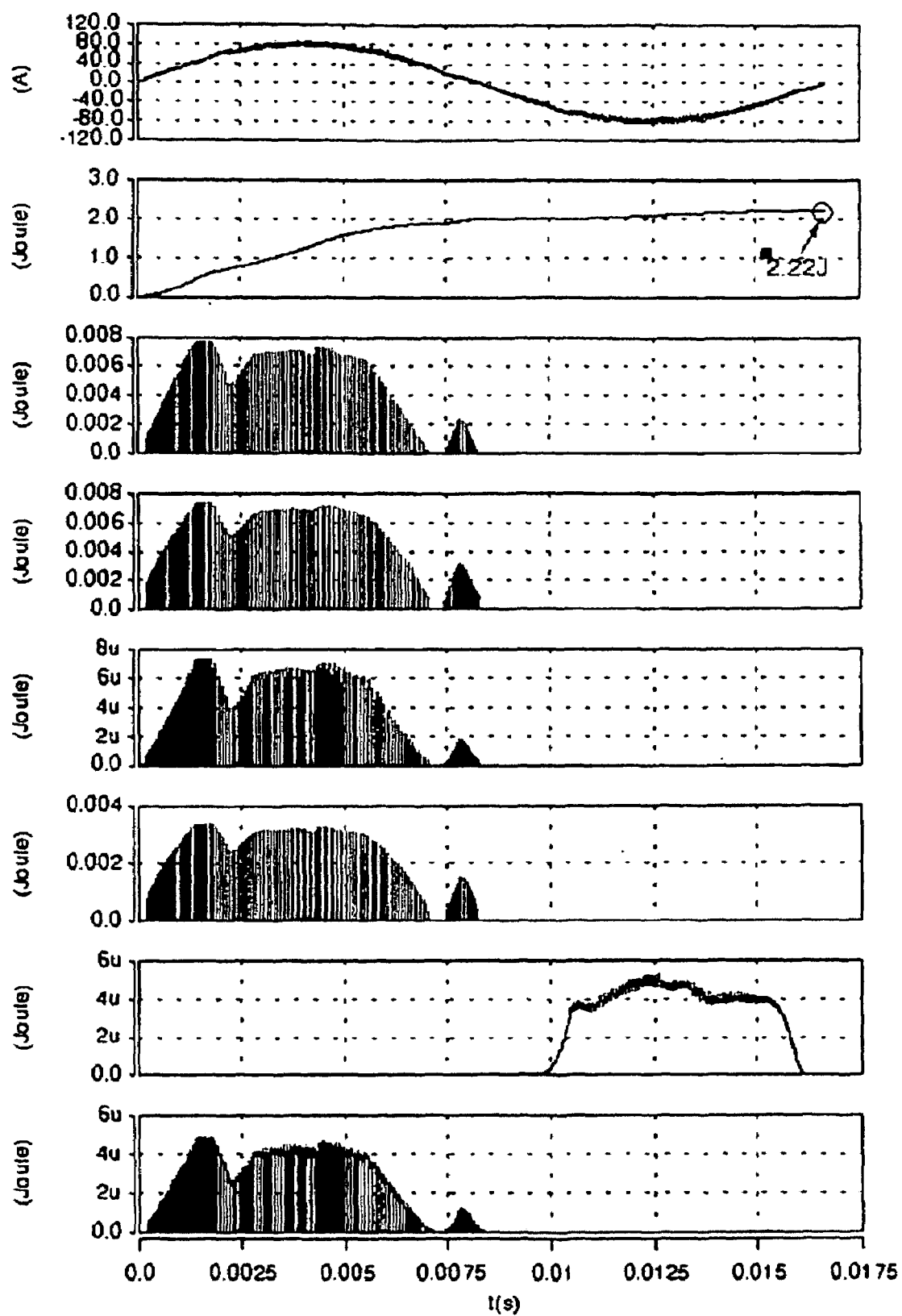
FIG. 15 are waveforms over a cycle for one phase current and of semiconductor losses for a simulation of the rectifier of FIGS. 1 and 2.

A detailed loss modeling of the IGBTs and diodes and the procedure for loss calculation has been explained above. Based on this method, the losses occurring for different semiconductor components as well as the cumulative loss of the rectifier have been simulated dynamically and the simulation results are given for one full cycle in FIG. 15. Losses across each component as well as the total loss incurred in one leg of a half-controlled rectifier are given in this figure. The 'cummulative_total_loss' is the cumulative summation of all the component losses of one individual rectifier phase leg shown in the above figure. It was determined that the total cumulative loss of a phase leg of a half-controlled rectifier over one full cycle of operation is 2.22 J. Thus, the total loss over one cycle (16.66 ms) for the rectifier will be 6 times (for six legs combining two half-controlled rectifiers) 2.22 J, which is equal to 13.32 J. The total loss of the rectifier over 1 second can be calculated as (13.32/0.01666) watt, which is equal to 799.5 watts. The simulation results of the losses were conducted at the rated power condition with 4 A (i.e. ±2 A) peak to peak hysteresis band for the individual current regulator.

With similar operating conditions (8 A peak-to-peak hystersis band, 1 mH line side inductance and with full load) the losses in a conventional six switch rectifier were also simulated and total cumulative loss over one cycle was estimated to be 2.584 J. Thus, the total loss of this conventional rectifier over one cycle will be 6 times (for six switches and their anti-parallel diodes) 2.584 J, which is equal to 15.504 J. The same can be converted for 1 second as (15.504/0.01666) or 930 watts, which is roughly 16% higher loss than the rectifier of the invention. This example is provided for general comparison purposes only, and is not an indication that the loss of the rectifier of the invention will always be better than or of the same magnitude of improvement with respect to all fully controlled active rectifiers.

A further issue is the effect on the passive elements of the present rectifier in comparison to the conventional six switch rectifier. To facilitate this comparison, the currents through the individual half-controlled rectifiers and their FFTs (fast Fourier transformations) are plotted in FIG. 11. From the FFTs it may be calculated, using standard practice, that the individual phase currents of each rectifier (ia1 and ia2) have roughly 47% THD with respect to their fundamentals (considering up to the 14th harmonic for the calculation). Also, from FIG. 7 it may be seen that the rms currents of individual rectifier phase currents (ia1 and ia2) are 29.188 A and 29.614 A respectively, whereas the rms current for their combined waveform (ia) is 56.863 A. This result implies that the total rms current in the secondary windings of the transformer has been increased by 1.9397 A (29.188+29.614−55.6), which is about 3.4% higher than that of the conventional rectifier.

Also, the resistances of the individual phases of the secondary winding of the present rectifier will be increased by a factor of two assuming the number of turns remains the same and the area of the cross section of each winding is reduced in half. It can be calculated that the copper losses in the individual secondary winding of the transformer will be higher by around 6.94% $(((29.188)^2*2\ R+(29.614)^2*2\ R-56.853^2*R)/(56.863^2*R)))$. However, the copper loss of the primary side remains the same, since the currents on the primary side still remain sinusoidal with magnitudes at the rated value. Therefore, the total copper loss of the transformer (combining the primary and the secondary) with the present rectifier will be increased by only about 3.5%. The core loss of the transformer is expected to remain the same as that of a regular six switch rectifier since the flux through the transformer core is almost sinusoidal without having any appreciable harmonics. Thus, the total loss (combining copper loss and iron loss) of the transformer may increase by around 2% for the present rectifier. It can also be inferred that the volume of the AC side isolation transformer for the present rectifier needs to be slightly greater due to the higher secondary rms current requirement and to the separate insulation requirement for the two secondary windings. However, this increase in volume is quite negligible.

Following similar reasoning, for the rectifier configuration 27 in FIG. 2, the inductors 80 and 84 will have slightly more volume (5–6% higher) than the inductors in a conventional six switch rectifier. However, since the switching losses in the present rectifier are 16% less and the dead time requirement is eliminated, the switching frequency can be increased by around 25% using the same switching devices without exceeding the thermal limit of the devices. Thus, the inductor size can potentially be reduced by 25% should this reduction be desirable.

The total ripple current content of a conventional six switch rectifier and the rectifier of the present invention for a similar load and the same switching frequently are approximately the same. Thus, the DC side capacitance requirements for the present rectifier will remain essentially the same as that of a conventional six switch rectifier.

Figure 16:
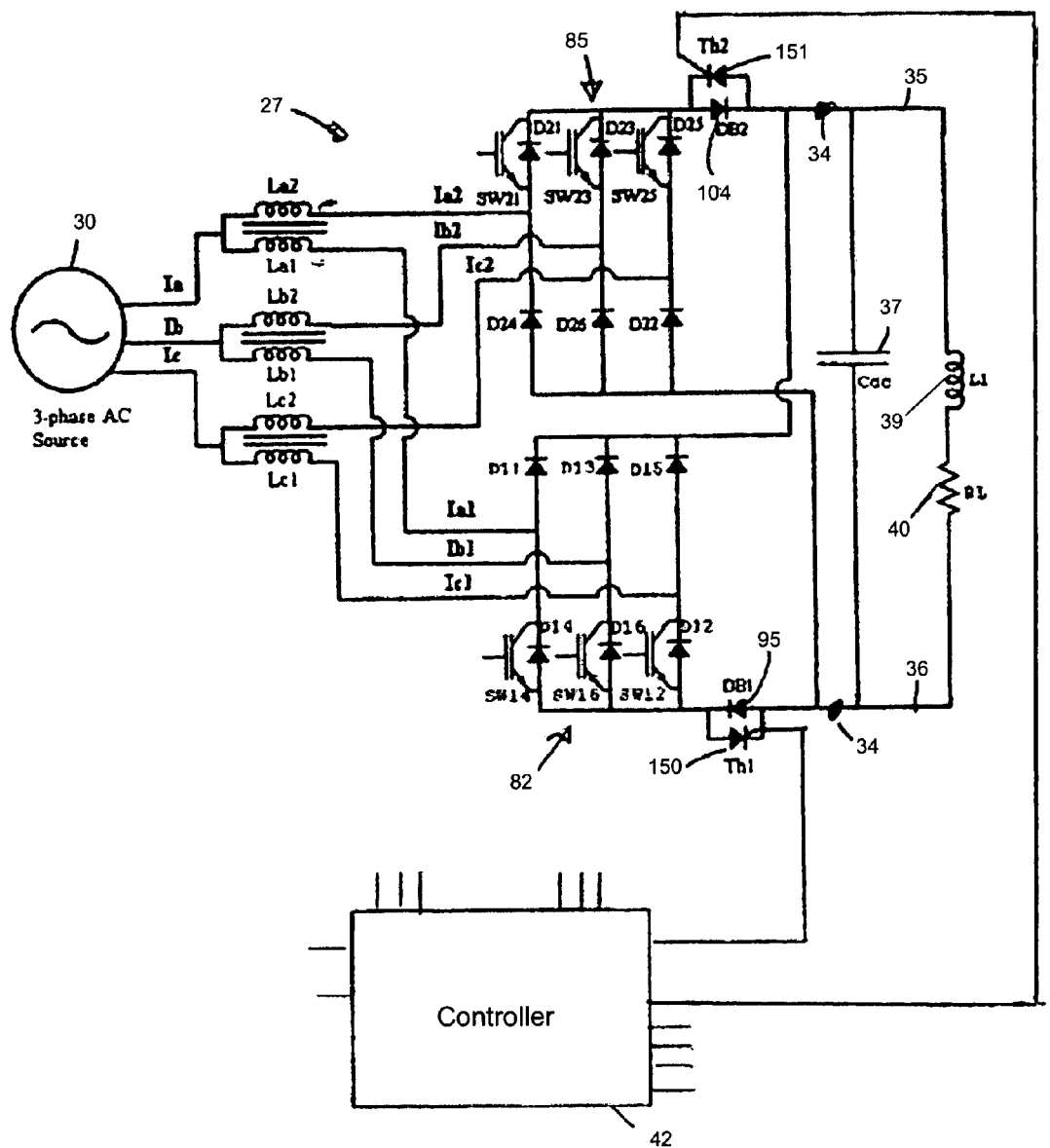
FIG. 16 is a schematic circuit diagram of a rectifier in accordance with the invention similar to that of FIG. 2 which includes DC side thyristor switches to allow regenerative flow of power from the load to the AC power system.
Figure 17:
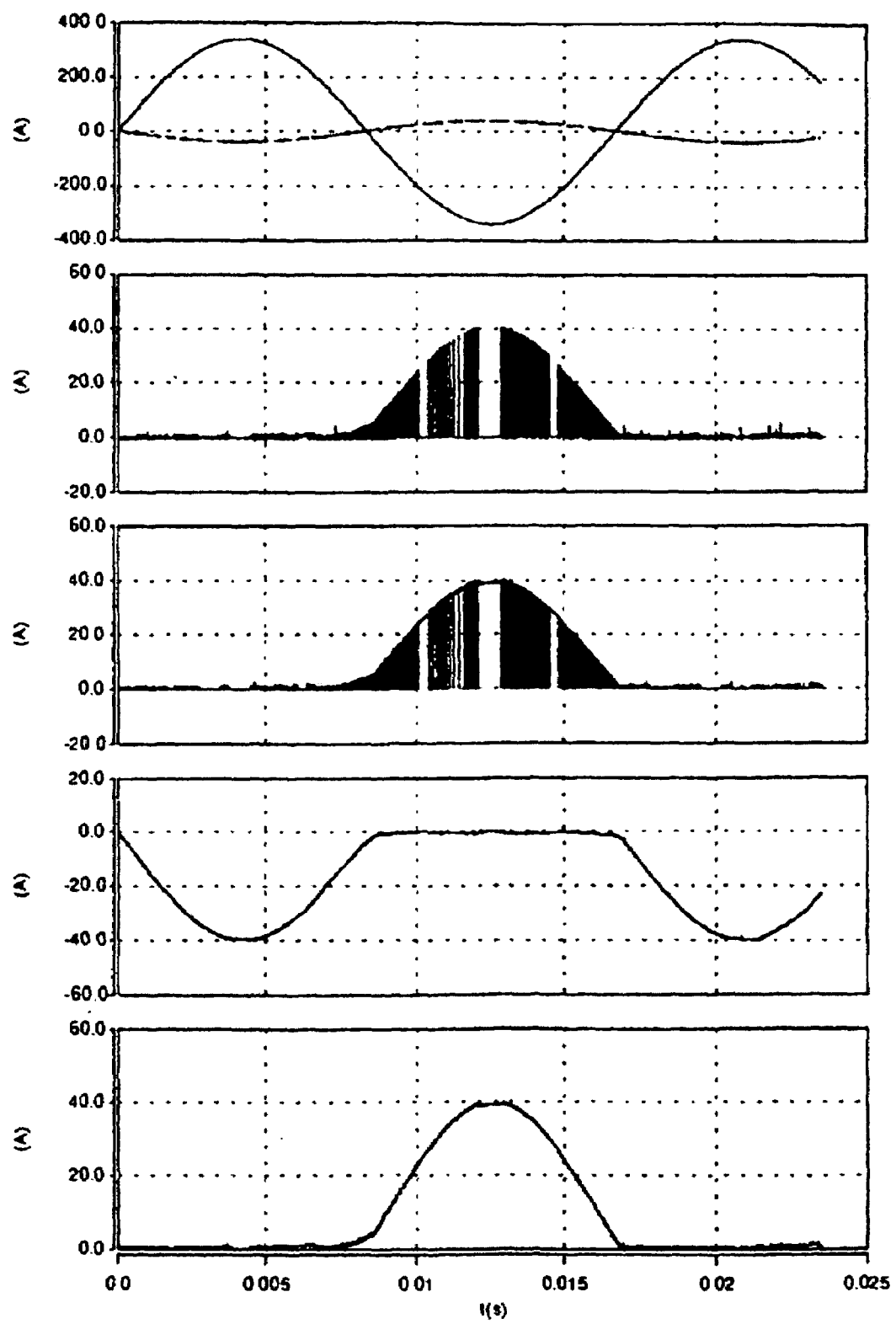
FIG. 17 are waveforms showing phase currents for a simulation of the rectifier of FIG. 16 during regenerating operation.

To provide the capability of transferring power from regenerative loads to the AC power system 30, the non-isolated rectifier 27 of FIG. 2 may be modified as shown in FIG. 16 by adding controlled switching devices 150 and 151 in parallel with the diodes 95 and 104, respectively. The rectifier configuration of FIG. 16 is capable of 100% power rectification and 50% power regeneration. Preferred switching devices 150 and 151 are line commutated thyristors (SCRs) anti-parallel to the diodes 95 and 104. When the rectifiers 82 and 84 are operating in rectification mode, the gate pulses for both the thyristors 150 and 151 are turned off by the controller 42 and the circuit acts as a regular rectifier as explained above. However, during regenerating mode of operation (such as when a motor load delivers power back to the DC bus), the gate pulses to the switching devices 150 and 151 are kept on continuously by the controller 42, the half controlled bridges 82 and 85 together act as one regular inverter, and the control of the switching devices in the bridges 82 and 85 reverts to a control for a single full bridge inverter operation. During the regenerating mode, the regular rectification control algorithm remains in standby mode and becomes active when the rectification mode again comes into operation. As illustrated in FIG. 3, the output of the PI controller 112 may be provided to a comparator 160, the output of which is provided directly and via an inverter amplifier 161 to a gate drive circuit for the thyristor gates so that the thyristors are off during normal rectification and on during ordinary regenerative mode operation. The regeneration capability of the system is restricted to only 50% of the rated power of the rectifier since the switches in the bridges 82 and 85 are only capable of handling 50% of the rated current. The performance of the circuit during steady-state regeneration is illustrated in FIG. 17. It can be seen that each half-controlled circuit phase (ia1, ia2) carries currents through only one half cycle, which is the typical case for any regular inverter. Also, it may be seen that the combined current waveform is out of phase with the supply voltage, which confirms the regeneration operation. The peak current through individual phases of each half-controlled rectifier is 40 A, which is the same as the peak current of the total phase current (ia). The currents through different switch components are also illustrated in FIG. 17. The transition from rectification mode to regeneration mode and vice versa is smooth and the current waveform is always sinusoidal, and the unity power factor interface with the supply is maintained at all times.

It is understood that the invention is not confined to the particular embodiments set forth herein as illustrative, but embraces all such forms thereof as come within the scope of the following claims.

What is claimed is:

1. A rectifier comprising:
   (a) AC input lines at which AC power is received by the rectifier and DC output terminals at which DC power is provided by the rectifier;
   (b) a first half-controlled bridge rectifier having an AC input and a DC output connected to the DC output terminals, the first half-controlled bridge rectifier having a full bridge of diodes connected between the AC input and DC output and controllable switching devices connected in parallel with half of the diodes in the bridge;
   (c) a second half-controlled bridge rectifier having an AC input and a DC output connected to the DC output terminals to provide DC power thereto in parallel with the first half-controlled bridge rectifier, the second half-controlled bridge rectifier having a full bridge of diodes connected between the AC input and the DC output and controllable switching devices connected in parallel with half of the diodes in the bridge;
   (d) inductances connected between the AC input lines of the rectifier and the AC inputs of the first and second half-controlled bridge rectifiers to provide AC power to the bridge rectifiers through the inductances; and
   (e) a controller connected to the switching devices of the first and second half-controlled bridge rectifiers to control the switching thereof.

2. The rectifier of claim 1 wherein the inductances connected between the AC input terminals and the AC inputs of the bridges comprises a transformer having a primary connected to the AC input lines of the rectifier and a first secondary connected to the AC input of the first bridge rectifier and a second secondary connected to the AC input of the second bridge rectifier.

3. The rectifier of claim 2 wherein the first and second secondaries of the transformer are complementary and oppositely poled.

4. The rectifier of claim 3 wherein the transformer is a three-phase transformer having a three-phase primary and wherein the first and second secondaries are three-phase secondaries, and wherein the first and second half-controlled bridges are formed of six diodes connected to the transformer secondaries between pairs of upper and lower diodes, and wherein the switching devices in each of the half-controlled bridges are connected in anti-parallel with the three lower diodes in each bridge of diodes.

5. The rectifier of claim 4 wherein the switching devices comprise IGBTs connected in anti-parallel with the diodes and having gate inputs connected to receive gate control signals from the controller.

6. The rectifier of claim 5 further including a DC bus capacitor connected across the output terminals of the rectifier.

7. The rectifier of claim 5 wherein the controller receives signals corresponding to the input voltage across at least two of the input lines of the rectifier, the output voltage across the output terminals of the rectifier, and the output currents from the first and second half-controlled bridge rectifiers, and wherein the controller controls the switching devices of the first and second half-controlled bridges for unity power factor at the AC input lines of the rectifier.

8. The rectifier of claim 1 wherein the inductances comprise inductors connected in series between each of the AC input lines of the rectifier and a junction between each pair of diodes in the first and second half-controlled bridge rectifiers.

9. The rectifier of claim 8 wherein there are three AC input lines to the rectifier to receive three-phase AC power and wherein each of the AC input lines is connected through an inductor to a junction between one pair of diodes in the first half-controlled bridge rectifier and a pair of diodes in the second half-controlled bridge rectifier, wherein there are six diodes in each of the first and second half-controlled bridge rectifiers connected in pairs of upper and lower diodes and wherein the switching devices are connected in anti-parallel with the lower diodes in the first half-controlled bridge and are connected in anti-parallel with the upper diodes of each pair in the second half-controlled rectifier bridge.

10. The rectifier of claim 9 wherein the switching devices comprise IGBTs having gate inputs connected to receive gate control signals from the controller.

11. The rectifier of claim 9 further including a DC bus capacitor connected across the output terminals of the rectifier.

12. The rectifier of claim 9 wherein the controller receives signals corresponding to the input voltage across at least two of the input lines of the rectifier, the output voltage across the output terminals of the rectifier, and the output currents from the first and second half-controlled bridge rectifiers, and wherein the controller controls the switching devices of the first and second half-controlled rectifier bridges for unity power factor at the AC input lines of the rectifier.

13. The rectifier of claim 9 further including a diode connected to the first rectifier bridge to prevent backflow of current from the first rectifier bridge and a diode connected to the second rectifier bridge to prevent backflow of current from the second rectifier bridge.

14. The rectifier of claim 13 including a thyristor connected in anti-parallel with the diodes connected to the first and second rectifier bridges that can be triggered to conduct during regenerative operation.

15. The rectifier of claim 9 wherein the two inductors connected to each AC input line are wound on a common core.

16. A rectifier comprising:
(a) three-phase AC input lines at which AC power is received by the rectifier and DC output terminals at which DC power is provided by the rectifier;
(b) a three-phase transformer having a primary connected to the AC input lines and a first three-phase secondary and a second three-phase secondary, wherein the first and second secondaries are complementary and oppositely poled;
(c) a first half-controlled bridge rectifier having a DC output connected to the DC output terminals, the first half-controlled bridge rectifier having a full bridge of six diodes connected to the first secondary between pairs of upper and lower diodes, and three controllable switching devices connected in parallel with three lower diodes in the bridge;
(d) a second half-controlled bridge rectifier having a DC output connected to the DC output terminals to provide DC power thereto in parallel with the first half-controlled bridge rectifier, the second half-controlled bridge rectifier having a full bridge of six diodes connected to the second secondary between pairs of upper and lower diodes, and three controllable switching devices connected in parallel with three lower diodes in the bridge; and
(e) a controller connected to the switching devices of the first and second half-controlled bridge rectifiers to control the switching thereof.

17. The rectifier of claim 16 wherein the switching devices comprise IGBTs connected in anti-parallel with the diodes and having gate inputs connected to receive gate control signals from the controller.

18. The rectifier of claim 16 further including a DC bus capacitor connected across the output terminals of the rectifier.

19. The rectifier of claim 16 wherein the controller receives signals corresponding to the input voltage across at least two of the input lines of the rectifier, the output voltage across the output terminals of the rectifier, and the output currents from the first and second half-controlled bridge rectifiers, and wherein the controller controls the switching devices of the first and second half-controlled bridges for unity power factor at the AC input lines of the rectifier.

20. A rectifier comprising:
(a) three-phase AC input lines at which AC power is received by the rectifier and DC output terminals at which DC power is provided by the rectifier;
(b) a first half-controlled bridge rectifier connected to the DC output terminals, the first half-controlled bridge rectifier having a full bridge of six diodes connected in upper and lower pairs of diodes to the DC output terminals and three controllable switching devices connected in parallel with three lower diodes in the bridge;
(c) a second half-controlled bridge rectifier connected to the DC output terminals to provide DC power thereto in parallel with the first half-controlled bridge rectifier, the second half-controlled bridge rectifier having a full bridge of six diodes connected in upper and lower pairs of diodes to the DC output terminals and three controllable switching devices connected in parallel with three upper diodes in the bridge;
(d) inductors connected in series between each of the AC input lines of the rectifier and a junction between each pair of upper and lower diodes of the first and second half-controlled bridge rectifiers to provide AC power to the bridge rectifiers through the inductors such that there are two inductors connected to each input line; and
(e) a controller connected to the switching devices of the first and second half-controlled bridge rectifiers to control the switching thereof.

21. The rectifier of claim 20 wherein the switching devices comprise IGBTs connected in anti-parallel with the diodes and having gate inputs connected to receive gate control signals from the controller.

22. The rectifier of claim 20 further including a DC bus capacitor connected across the output terminals of the rectifier.

23. The rectifier of claim 20 wherein the controller receives signals corresponding to the input voltage across at least two of the input lines of the rectifier, the output voltage across the output terminals of the rectifier, and the output currents from the first and second half-controlled bridge rectifiers, and wherein the controller controls the switching devices of the first and second half-controlled bridges for unity power factor at the AC input lines of the rectifier.

24. The rectifier of claim 20 further including a diode connected to the first rectifier bridge to prevent backflow of current from the first rectifier bridge and a diode connected to the second rectifier bridge to prevent backflow of current from the second rectifier bridge.

25. The rectifier of claim 24 including a thyristor connected in anti-parallel with each of the diodes connected to the first and second rectifier bridges that can be triggered to conduct during regenerative operation.

26. The rectifier of claim 20 wherein the two inductors connected to each AC input line are wound on a common core.

27. A method of controlled rectification of AC power to DC power comprising:

(a) providing a rectifier comprising:

(1) AC input lines at which AC power is received by the rectifier and DC output terminals at which DC power is provided by the rectifier;

(2) a first half-controlled bridge rectifier having an AC input and a DC output connected to the DC output terminals, the first half-controlled bridge rectifier having a full bridge of diodes connected between the AC input and DC output and controllable switching devices connected in parallel with half of the diodes in the bridge;

(3) a second half-controlled bridge rectifier having an AC input and a DC output connected to the DC output terminals to provide DC power thereto in parallel with the first half-controlled bridge rectifier, the second half-controlled bridge rectifier having a full bridge of diodes connected between the AC input and the DC output and controllable switching devices connected in parallel with half of the diodes in the bridge; and (4) inductances connected between the AC input lines of the rectifier and the AC inputs of the first and second half-controlled bridge rectifiers to provide AC power to the bridge rectifiers through the inductances; and (b) controlling the switching of the switching devices of the first and second half-controlled bridge rectifiers to provide a selected power factor at the AC input lines.

28. The method of claim 27 wherein the switching of the switching devices is controlled to provide unity power factor.

* * * * *

UNITED STATES PATENT AND TRADEMARK OFFICE
CERTIFICATE OF CORRECTION

| | | |
|---|---|---|
| PATENT NO. | : 7,006,366 B2 | Page 1 of 1 |
| APPLICATION NO. | : 10/865043 | |
| DATED | : February 28, 2006 | |
| INVENTOR(S) | : Debiprasad Panda and Thomas A. Lipo | |

It is certified that error appears in the above-identified patent and that said Letters Patent is hereby corrected as shown below:

In Col. 1, after the title and before "FIELD OF THE INVENTION", please insert:

--REFERENCE TO GOVERNMENT RIGHTS

This invention was made with United States government support awarded by the following agency: DOE DE-AC36-99-G010337. The United States has certain rights in this invention.--

Signed and Sealed this

Twenty-fourth Day of April, 2007

JON W. DUDAS
*Director of the United States Patent and Trademark Office*